US008885706B2

(12) United States Patent
Bankoski et al.

(10) Patent No.: US 8,885,706 B2
(45) Date of Patent: Nov. 11, 2014

(54) APPARATUS AND METHODOLOGY FOR A VIDEO CODEC SYSTEM WITH NOISE REDUCTION CAPABILITY

(75) Inventors: James Barnard Bankoski, Los Gatos, CA (US); Anil Christopher Kokaram, Santa Clara, CA (US); Yaowu Xu, San Diego, CA (US)

(73) Assignee: Google Inc., Mountain View, CA (US)

( * ) Notice: Subject to any disclaimer, the term of this patent is extended or adjusted under 35 U.S.C. 154(b) by 524 days.

(21) Appl. No.: 13/234,614

(22) Filed: Sep. 16, 2011

(65) Prior Publication Data

US 2013/0128957 A1    May 23, 2013

(51) Int. Cl.
| | |
|---|---|
| H04N 7/12 | (2006.01) |
| H04N 11/02 | (2006.01) |
| H04N 11/04 | (2006.01) |
| H04N 19/14 | (2014.01) |
| H04N 19/176 | (2014.01) |
| H04N 19/132 | (2014.01) |
| H04N 19/18 | (2014.01) |
| H04N 19/126 | (2014.01) |
| G06T 5/00 | (2006.01) |
| H04N 19/48 | (2014.01) |
| H04N 19/46 | (2014.01) |

(52) U.S. Cl.
CPC ... H04N 19/00563 (2013.01); H04N 19/00157 (2013.01); G06T 2207/20021 (2013.01); G06T 2207/10016 (2013.01); H04N 19/00278 (2013.01); H04N 19/00127 (2013.01); H04N 19/00296 (2013.01); H04N 19/00096 (2013.01); G06T 5/002 (2013.01); H04N 19/00545 (2013.01)
USPC .............. 375/240.03; 375/240.01; 375/240.02

(58) Field of Classification Search
CPC ................................. H04N 7/50; H04N 7/502
See application file for complete search history.

(56) References Cited

U.S. PATENT DOCUMENTS

| | | | |
|---|---|---|---|
| 3,825,832 | A | 7/1974 | Frei et al. |
| 4,719,642 | A | 1/1988 | Lucas |
| 4,729,127 | A | 3/1988 | Chan et al. |

(Continued)

FOREIGN PATENT DOCUMENTS

| | | |
|---|---|---|
| EP | 0634873 | 1/1995 |
| EP | 0 777 388 A2 | 6/1997 |

(Continued)

OTHER PUBLICATIONS

Tan, et al., "Classified Perceptual Coding with Adaptive Quantization," IEEE Transactions on Circuits and Systems for Video Technology, Aug. 1996, pp. 375-388, vol. 6, No. 4.

(Continued)

*Primary Examiner* — Chikaodili E Anyikire
(74) *Attorney, Agent, or Firm* — Young Basile Hanlon & MacFarlane P.C.

(57) ABSTRACT

Systems and methods for noise reduction are disclosed herein. The system includes a video codec system that can encode and/or decode video information. A noise representation component can identify flat regions and a quantizer can utilize the identified flat regions to suppress noise during compression. By suppressing noise during compression, the size of the video file to be compressed can be reduced, compression can use less resources and take less time, and the speed at which the compressed information is transferred can benefit. Noise can be reintroduced during the reconstruction of the video. Accordingly, both noise reduction and noise synthesis can be accomplished.

26 Claims, 14 Drawing Sheets

(56) References Cited

U.S. PATENT DOCUMENTS

| | | |
|---|---|---|
| 4,736,446 A | 4/1988 | Reynolds et al. |
| 4,816,906 A | 3/1989 | Kummerfeldt et al. |
| 4,868,764 A | 9/1989 | Richards |
| 4,891,748 A | 1/1990 | Mann |
| 4,924,310 A | 5/1990 | von Brandt |
| 5,068,724 A | 11/1991 | Krause et al. |
| 5,083,214 A | 1/1992 | Knowles |
| 5,091,782 A | 2/1992 | Krause et al. |
| 5,136,371 A | 8/1992 | Savatier et al. |
| 5,136,376 A | 8/1992 | Yagasaki et al. |
| 5,148,269 A | 9/1992 | de Haan et al. |
| 5,164,819 A | 11/1992 | Music |
| 5,270,812 A | 12/1993 | Richards |
| 5,274,442 A | 12/1993 | Murakami et al. |
| 5,278,647 A | 1/1994 | Hingorani et al. |
| 5,313,306 A | 5/1994 | Kuban et al. |
| 5,337,086 A | 8/1994 | Fujinami |
| 5,341,440 A | 8/1994 | Earl et al. |
| 5,365,280 A | 11/1994 | De Haan et al. |
| 5,377,018 A | 12/1994 | Rafferty |
| 5,398,068 A | 3/1995 | Liu et al. |
| 5,432,870 A | 7/1995 | Schwartz |
| 5,457,780 A | 10/1995 | Shaw et al. |
| 5,461,423 A | 10/1995 | Tsukagoshi |
| 5,488,570 A | 1/1996 | Agarwal |
| 5,512,952 A | 4/1996 | Iwamura |
| 5,561,477 A | 10/1996 | Polit |
| 5,568,200 A | 10/1996 | Pearlstein et al. |
| 5,576,767 A | 11/1996 | Lee et al. |
| 5,579,348 A | 11/1996 | Walker et al. |
| 5,589,945 A | 12/1996 | Abecassis |
| 5,623,308 A | 4/1997 | Civanlar et al. |
| 5,629,736 A | 5/1997 | Haskell et al. |
| 5,640,208 A | 6/1997 | Fujinami |
| 5,659,539 A | 8/1997 | Porter et al. |
| 5,686,962 A | 11/1997 | Chung et al. |
| 5,689,306 A | 11/1997 | Jung |
| 5,696,869 A | 12/1997 | Abecassis |
| 5,717,791 A | 2/1998 | Labaere et al. |
| 5,721,822 A | 2/1998 | Agarwal |
| 5,731,840 A | 3/1998 | Kikuchi et al. |
| 5,734,744 A | 3/1998 | Wittenstein et al. |
| 5,737,020 A | 4/1998 | Hall et al. |
| 5,748,242 A | 5/1998 | Podilchuk |
| 5,748,247 A | 5/1998 | Hu |
| 5,767,909 A | 6/1998 | Jung |
| 5,774,593 A | 6/1998 | Zick et al. |
| 5,793,647 A | 8/1998 | Hageniers et al. |
| 5,812,197 A | 9/1998 | Chan et al. |
| 5,818,536 A | 10/1998 | Morris et al. |
| 5,818,969 A | 10/1998 | Astle |
| 5,828,370 A | 10/1998 | Moeller et al. |
| 5,886,742 A | 3/1999 | Hibi et al. |
| 5,903,264 A | 5/1999 | Moeller et al. |
| 5,929,940 A | 7/1999 | Jeannin |
| 5,930,493 A | 7/1999 | Ottesen et al. |
| 5,946,414 A | 8/1999 | Cass et al. |
| 5,959,672 A | 9/1999 | Sasaki |
| 5,963,203 A | 10/1999 | Goldberg et al. |
| 5,969,777 A | 10/1999 | Mawatari |
| 5,985,526 A | 11/1999 | Tutt et al. |
| 5,987,866 A | 11/1999 | Weeger et al. |
| 5,991,447 A | 11/1999 | Eifrig et al. |
| 5,999,641 A | 12/1999 | Miller et al. |
| 6,005,980 A | 12/1999 | Eifrig et al. |
| 6,014,706 A | 1/2000 | Cannon et al. |
| 6,041,145 A | 3/2000 | Hayashi et al. |
| 6,061,397 A | 5/2000 | Ogura |
| 6,084,908 A | 7/2000 | Chiang et al. |
| 6,097,842 A | 8/2000 | Suzuki et al. |
| 6,100,940 A | 8/2000 | Dieterich |
| 6,108,383 A | 8/2000 | Miller et al. |
| 6,112,234 A | 8/2000 | Leiper |
| 6,115,501 A | 9/2000 | Chun et al. |
| 6,119,154 A | 9/2000 | Weaver et al. |
| 6,125,144 A | 9/2000 | Matsumura et al. |
| 6,141,381 A | 10/2000 | Sugiyama |
| 6,167,164 A | 12/2000 | Lee |
| 6,181,822 B1 | 1/2001 | Miller et al. |
| 6,185,363 B1 | 2/2001 | Dimitrova et al. |
| 6,188,799 B1 | 2/2001 | Tan et al. |
| 6,233,279 B1 | 5/2001 | Boon |
| 6,240,135 B1 | 5/2001 | Kim |
| 6,272,179 B1 | 8/2001 | Kadono |
| 6,277,075 B1 | 8/2001 | Torp et al. |
| 6,285,801 B1 | 9/2001 | Mancuso et al. |
| 6,289,049 B1 | 9/2001 | Kim et al. |
| 6,292,837 B1 | 9/2001 | Miller et al. |
| 6,327,304 B1 | 12/2001 | Miller et al. |
| 6,359,929 B1 | 3/2002 | Boon |
| 6,370,267 B1 | 4/2002 | Miller et al. |
| 6,381,277 B1 | 4/2002 | Chun et al. |
| 6,400,763 B1 | 6/2002 | Wee |
| 6,414,995 B2 | 7/2002 | Okumura et al. |
| 6,418,166 B1 | 7/2002 | Wu et al. |
| 6,434,197 B1 | 8/2002 | Wang et al. |
| 6,473,463 B2 | 10/2002 | Agarwal |
| 6,522,784 B1 | 2/2003 | Zlotnick |
| 6,529,638 B1 | 3/2003 | Westerman |
| 6,535,555 B1 | 3/2003 | Bordes et al. |
| 6,560,366 B1 | 5/2003 | Wilkins |
| 6,621,867 B1 | 9/2003 | Sazzad et al. |
| 6,661,842 B1 | 12/2003 | Abousleman |
| 6,687,303 B1 | 2/2004 | Ishihara |
| 6,694,342 B1 | 2/2004 | Mou |
| 6,697,061 B1 | 2/2004 | Wee et al. |
| 6,707,952 B1 | 3/2004 | Tan et al. |
| 6,711,211 B1 | 3/2004 | Lainema |
| 6,735,249 B1 | 5/2004 | Karczewicz et al. |
| 6,765,964 B1 | 7/2004 | Conklin |
| 6,798,837 B1 | 9/2004 | Uenoyama et al. |
| 6,807,317 B2 | 10/2004 | Mathew et al. |
| 6,826,229 B2 | 11/2004 | Kawashima et al. |
| 6,904,091 B1 | 6/2005 | Schelkens et al. |
| 6,904,096 B2 | 6/2005 | Kobayashi et al. |
| 6,907,079 B2 | 6/2005 | Gomila et al. |
| 6,934,419 B2 | 8/2005 | Zlotnick |
| 6,985,526 B2 | 1/2006 | Bottreau et al. |
| 6,985,527 B2 | 1/2006 | Gunter et al. |
| 6,987,866 B2 | 1/2006 | Hu |
| 7,027,654 B1 | 4/2006 | Ameres et al. |
| 7,031,546 B2 | 4/2006 | Maeda et al. |
| 7,054,367 B2 | 5/2006 | Oguz et al. |
| 7,088,351 B2 | 8/2006 | Wang |
| 7,116,831 B2 | 10/2006 | Mukerjee et al. |
| 7,120,197 B2 | 10/2006 | Lin et al. |
| 7,170,937 B2 | 1/2007 | Zhou |
| 7,194,036 B1 | 3/2007 | Melanson |
| 7,226,150 B2 | 6/2007 | Yoshimura et al. |
| 7,236,524 B2 | 6/2007 | Sun et al. |
| 7,277,592 B1 | 10/2007 | Lin |
| 7,330,509 B2 | 2/2008 | Lu et al. |
| 7,358,881 B2 | 4/2008 | Melanson |
| 7,447,337 B2 | 11/2008 | Zhang et al. |
| 7,492,823 B2 | 2/2009 | Lee et al. |
| 7,499,492 B1 | 3/2009 | Ameres et al. |
| 7,590,179 B2 | 9/2009 | Mukerjee |
| 7,602,851 B2 | 10/2009 | Lee et al. |
| 7,606,310 B1 | 10/2009 | Ameres et al. |
| 7,620,103 B2 | 11/2009 | Cote et al. |
| 7,627,040 B2 | 12/2009 | Woods et al. |
| 7,657,098 B2 | 2/2010 | Lin et al. |
| 7,751,514 B2 | 7/2010 | Tsuie et al. |
| 7,885,476 B2 | 2/2011 | Zhang |
| 7,916,783 B2 | 3/2011 | Gao et al. |
| 2001/0022815 A1 | 9/2001 | Agarwal |
| 2002/0031272 A1 | 3/2002 | Bagni et al. |
| 2002/0036705 A1 | 3/2002 | Lee et al. |
| 2002/0064228 A1 | 5/2002 | Sethuraman et al. |
| 2002/0094130 A1 | 7/2002 | Bruls et al. |
| 2002/0168114 A1 | 11/2002 | Valente |
| 2002/0172431 A1 | 11/2002 | Atkins et al. |
| 2003/0023982 A1 | 1/2003 | Lee et al. |
| 2003/0039310 A1 | 2/2003 | Wu et al. |

(56) References Cited

U.S. PATENT DOCUMENTS

| | | |
|---|---|---|
| 2003/0053708 A1 | 3/2003 | Kryukov et al. |
| 2003/0053711 A1 | 3/2003 | Kim |
| 2003/0081850 A1 | 5/2003 | Karczewicz et al. |
| 2003/0142753 A1 | 7/2003 | Gunday |
| 2003/0165331 A1 | 9/2003 | Van Der Schaar |
| 2003/0189982 A1 | 10/2003 | MacInnis |
| 2003/0194009 A1 | 10/2003 | Srinivasan |
| 2003/0215014 A1 | 11/2003 | Koto et al. |
| 2004/0013308 A1 | 1/2004 | Jeon et al. |
| 2004/0017939 A1 | 1/2004 | Mehrotra |
| 2004/0042549 A1 | 3/2004 | Huang et al. |
| 2004/0047416 A1 | 3/2004 | Tomita |
| 2004/0062307 A1 | 4/2004 | Hallapuro et al. |
| 2004/0080669 A1 | 4/2004 | Nagai et al. |
| 2004/0120400 A1 | 6/2004 | Linzer |
| 2004/0179610 A1 | 9/2004 | Lu et al. |
| 2004/0181564 A1 | 9/2004 | MacInnis et al. |
| 2004/0184533 A1 | 9/2004 | Wang |
| 2004/0228410 A1 | 11/2004 | Ameres et al. |
| 2004/0240556 A1 | 12/2004 | Winger et al. |
| 2005/0013358 A1 | 1/2005 | Song et al. |
| 2005/0013494 A1 | 1/2005 | Srinivasan et al. |
| 2005/0053294 A1 | 3/2005 | Mukerjee et al. |
| 2005/0117653 A1 | 6/2005 | Sankaran |
| 2005/0135699 A1 | 6/2005 | Anderson |
| 2005/0147165 A1 | 7/2005 | Yoo et al. |
| 2005/0169374 A1 | 8/2005 | Marpe et al. |
| 2005/0196063 A1 | 9/2005 | Guangxi et al. |
| 2005/0265447 A1 | 12/2005 | Park |
| 2005/0276323 A1 | 12/2005 | Martemyanov et al. |
| 2005/0276327 A1 | 12/2005 | Lee et al. |
| 2005/0286629 A1 | 12/2005 | Dumitras et al. |
| 2006/0013315 A1 | 1/2006 | Song |
| 2006/0062311 A1 | 3/2006 | Sun et al. |
| 2006/0093038 A1 | 5/2006 | Boyce |
| 2006/0098737 A1 | 5/2006 | Sethuraman et al. |
| 2006/0098738 A1 | 5/2006 | Cosman et al. |
| 2006/0126962 A1 | 6/2006 | Sun |
| 2006/0153301 A1 | 7/2006 | Guleryuz |
| 2006/0182181 A1 | 8/2006 | Lee et al. |
| 2006/0215758 A1 | 9/2006 | Kawashima |
| 2006/0239345 A1 | 10/2006 | Taubman et al. |
| 2006/0268990 A1 | 11/2006 | Lin et al. |
| 2007/0009044 A1 | 1/2007 | Tourapis et al. |
| 2007/0009171 A1 | 1/2007 | Nakashizuka et al. |
| 2007/0025448 A1 | 2/2007 | Cha et al. |
| 2007/0047648 A1 | 3/2007 | Tourapis et al. |
| 2007/0081593 A1 | 4/2007 | Jeong et al. |
| 2007/0098067 A1 | 5/2007 | Kim et al. |
| 2007/0110152 A1 | 5/2007 | Lee et al. |
| 2007/0140342 A1 | 6/2007 | Karczewicz et al. |
| 2007/0153899 A1 | 7/2007 | Koto et al. |
| 2007/0171988 A1 | 7/2007 | Panda et al. |
| 2007/0177673 A1 | 8/2007 | Yang |
| 2007/0189735 A1 | 8/2007 | Kawashima et al. |
| 2007/0201559 A1 | 8/2007 | He |
| 2007/0230572 A1 | 10/2007 | Koto et al. |
| 2007/0237241 A1 | 10/2007 | Ha et al. |
| 2007/0253490 A1 | 11/2007 | Makino |
| 2007/0253491 A1 | 11/2007 | Ito et al. |
| 2007/0274385 A1 | 11/2007 | He |
| 2007/0274388 A1 | 11/2007 | Lee et al. |
| 2008/0025398 A1 | 1/2008 | Molloy et al. |
| 2008/0025411 A1 | 1/2008 | Chen et al. |
| 2008/0080615 A1 | 4/2008 | Tourapis et al. |
| 2008/0101469 A1 | 5/2008 | Ishtiaq et al. |
| 2008/0130755 A1 | 6/2008 | Loukas et al. |
| 2008/0159649 A1 | 7/2008 | Kempf et al. |
| 2008/0170629 A1 | 7/2008 | Shim et al. |
| 2008/0198931 A1 | 8/2008 | Chappalli et al. |
| 2008/0212678 A1 | 9/2008 | Booth et al. |
| 2008/0219351 A1 | 9/2008 | Kim et al. |
| 2008/0279279 A1 | 11/2008 | Liu et al. |
| 2008/0298472 A1 | 12/2008 | Jain et al. |
| 2009/0003440 A1 | 1/2009 | Karczewicz et al. |
| 2009/0003717 A1 | 1/2009 | Sekiguchi et al. |
| 2009/0034617 A1 | 2/2009 | Tanaka |
| 2009/0161770 A1 | 6/2009 | Dong et al. |
| 2009/0185058 A1 | 7/2009 | Vakrat et al. |
| 2009/0196351 A1 | 8/2009 | Cho et al. |
| 2009/0287493 A1 | 11/2009 | Janssen et al. |
| 2009/0316793 A1 | 12/2009 | Yang et al. |
| 2010/0022815 A1 | 1/2010 | Chikamatsu et al. |
| 2011/0007799 A1 | 1/2011 | Karczewicz et al. |
| 2011/0141237 A1 | 6/2011 | Cheng et al. |
| 2011/0268182 A1* | 11/2011 | Joshi .................. 375/240.03 |

FOREIGN PATENT DOCUMENTS

| | | |
|---|---|---|
| EP | 0 574 724 B1 | 11/1999 |
| EP | 0 771 507 B1 | 1/2000 |
| EP | 0 781 491 B1 | 1/2001 |
| EP | 0 779 742 B1 | 5/2002 |
| EP | 1351510 | 10/2003 |
| EP | 1511319 | 3/2005 |
| EP | 1555832 | 7/2005 |
| EP | 1 564 997 A1 | 8/2005 |
| EP | 1564997 | 8/2005 |
| EP | 1 365 590 B1 | 5/2007 |
| EP | 1838108 | 9/2007 |
| EP | 1840875 | 10/2007 |
| EP | 2 076 045 A1 | 7/2009 |
| JP | 61092073 | 5/1986 |
| JP | 2217088 | 8/1990 |
| JP | 06038197 | 2/1994 |
| JP | 8280032 | 10/1996 |
| JP | 09179987 | 7/1997 |
| JP | 11262018 | 9/1999 |
| JP | 11289544 | 10/1999 |
| JP | 11313332 | 11/1999 |
| JP | 11513205 | 11/1999 |
| JP | 2005503737 | 2/2005 |
| JP | 2005308623 | 11/2005 |
| KR | 100213018 | 8/1999 |
| KR | 200130916 | 4/2001 |
| WO | WO0150770 | 7/2001 |
| WO | WO02089487 | 11/2002 |
| WO | WO03026315 | 3/2003 |
| WO | WO2006602377 | 6/2006 |
| WO | WO2006036814 | 8/2006 |
| WO | WO2007052303 | 5/2007 |
| WO | WO2008005124 | 1/2008 |
| WO | 2010077325 | 7/2010 |
| WO | WO2012123855 | 9/2012 |

OTHER PUBLICATIONS

International Search Report and the Written Opinion of the International Searching Authority for International Application No. PCT/US2012/055386, mailed Nov. 7, 2012, 17 pages.

A High Efficient Method for Parallelizing Reconstructor & Loop Deblocking Filter on Multi-core Processor Platform, Feb. 2008.

An Optimized In-Loop H.264 De-Blocking Filter on Multi-Core Engines, Feb. 2007.

Architectures for Efficient Partitioning of Video Coding Algorithms—H. 264 decoder, Nov. 2006.

Bankoski et al. "Technical Overview of VP8, An Open Source Video Codec for the Web". Dated Jul. 11, 2011.

Bankoski et al. "VP8 Data Format and Decoding Guide; draft-bankoski-vp8-bitstream-02" Network Working Group. Internet-Draft, May 18, 2011, 288 pp.

Chen, Michael C., et al.; "Design and Optimization of a Differentially Coded Variable Block Size Motion Compensation System", IEEE 1996, 4 pp.

Chen, Xing C., et al.; "Quadtree Based Adaptive Lossy Coding of Motion Vectors", IEEE 1996, 4 pp.

Ebrahimi T Ed—Institute of Electrical and Electronics Engineers: "A new technique for motion field segmentation and coding for very low bitrate video coding applications"; Proceedings of the International Conference on Image Processing (ICIP); Austin, Nov. 13-16, 1994.

Guillotel, Philippe, et al.; "Comparison of motion vector coding techniques", SPIE vol. 2308, 1994, 11 pp.

(56) References Cited

OTHER PUBLICATIONS

Implementors' Guide; Series H: Audiovisual and Multimedia Systems; Coding of moving video: Implementors Guide for H.264: Advanced video coding for generic audiovisual services. H.264. International Telecommunication Union. Version 12. Dated Jul. 30, 2010.
International Telecommunications Union, ITU-T, Telecommunication Standardization Section of ITU, "Series H: Audiovisual and Multimedia Systems, Infrastructure of audiovisual services—Coding of moving video", Mar. 2010, 676 pp.
Karczewicz, Marta, et al.; "Video Coding Using Motion Compensation With Polynomial Motion Vector Fields", IEEE Comsoc Eurasip, First International Workshop on Wireless Image/Video Communications—Sep. 1996, 6 pp.
Kim, Jong Won, et al.; "On the Hierarchical Variable Block Size Motion Estimation Technique for Motion Sequence Coding", SPIE Visual Communication and Image Processing 1993, Cambridge, MA, Nov. 8, 1993, 29 pp.
Lee, Yung-Lyul; Park, Hyun Wook; "Loop Filtering and Post-Filtering for Low-Bit-Rates Moving Picture Coding", Signal Processing: Image Communication 16 (2001) pp. 871-890.
Lihua Zhu, Guangfei Zhu, Charles Wang; Implementation of video deblocking filter on GPU Apr. 8, 2008.
Liu, Bede, et al.; "A simple method to segment motion field for video coding", SPIE vol. 1818, Visual Communications and Image Processing 1992, 10 pp.
Liu, Bede, et al.; "New Fast Algorithms for the Estimation of Block Motion Vectors", IEEE Transactions on Circuits and Systems for Video Technology, vol. 3, No. 2, Apr. 1993, 10 pp.
Luttrell, Max, et al.; "Simulation Results for Modified Error Resilient Syntax With Data Partitioning and RVLC", ITU-Telecommunications Standardization Sector, Study Group 16, Video Coding Experts Group (Question 15), Sixth Meeting: Seoul, South Korea, Nov. 2, 1998, 34 pp.
Martin, Graham R., et al.; "Reduced Entropy Motion Compensation Using Variable Sized Blocks", SPIE vol. 3024, 1997, 10 pp.
Method for unloading YUV-filtered pixels from a deblocking filter for a video decoder, Oct. 11, 2006.
Mohmoudi, Mona et al.; "Fast Image and video Denoising via Nonlocal Means of Similar Neighborhoods"; IEEE Signal Processing Letters vol. 12, No. 12, Dec. 2005.
Mozilla, "Introduction to Video Coding Part 1: Transform Coding", Video Compression Overview, Mar. 2012, 171 pp.
Nicolas, H., et al.; "Region-based motion estimation using deterministic relaxation schemes for image sequence coding", IEEE 1992, 4 pp.
Nokia, Inc., Nokia Research Center, "MVC Decoder Description", Telecommunication Standardization Sector, Study Period 1997-2000, Geneva, Feb. 7, 2000, 99 pp.
ON2 Technologies Inc., White Paper TrueMotion VP7 Video Codec, Jan. 10, 2005, 13 pages, Document Version: 1.0, Clifton Park, New York.
Orchard, Michael T.; "Exploiting Scene Structure in Video Coding", IEEE 1991, 5 pp.
Orchard, Michael T.; "Predictive Motion-Field Segmentation for Image Sequence Coding", IEEE Transactions on Circuits and Systems for Video Technology, vol. 3, No. 1, Feb. 1993, 17 pp.
Overview; VP7 Data Format and Decoder. Version 1.5. On2 Technologies, Inc. Dated Mar. 28, 2005.
Schiller, H., et al.; "Efficient Coding of Side Information in a Low Bitrate Hybrid Image Coder", Signal Processing 19 (1990) Elsevier Science Publishers B.V. 61-73, 13 pp.
Schuster, Guido M., et al.; "A Video Compression Scheme With Optimal Bit Allocation Among Segmentation, Motion, and Residual Error", IEEE Transactions on Image Processing, vol. 6, No. 11, Nov. 1997, 16 pp.
Series H: Audiovisual and Multimedia Systems, Infrastructure of audiovisual services—Coding of moving video, Video coding for low bit rate communication, International Telecommunication Union, ITU-T Recommendation H.263, Feb. 1998, 167 pp.
Series H: Audiovisual and Multimedia Systems; Infrastructure of audiovisual services—Coding of moving video. H.264. Advanced video coding for generic audiovisual services. International Telecommunication Union. Version 11. Dated Mar. 2009.
Series H: Audiovisual and Multimedia Systems; Infrastructure of audiovisual services—Coding of moving video. H.264. Advanced video coding for generic audiovisual services. International Telecommunication Union. Version 12. Dated Mar. 2010.
Series H: Audiovisual and Multimedia Systems; Infrastructure of audiovisual services—Coding of moving video. H.264. Amendment 2: New profiles for professional applications. International Telecommunication Union. Dated Apr. 2007.
Series H: Audiovisual and Multimedia Systems; Infrastructure of audiovisual services—Coding of moving video. H.264. Advanced video coding for generic audiovisual services. Version 8. International Telecommunication Union. Dated Nov. 1, 2007.
Series H: Audiovisual and Multimedia Systems; Infrastructure of audiovisual services—Coding of moving video; Advanced video coding for generic audiovisual services. H.264. Amendment 1: Support of additional colour spaces and removal of the High 4:4:4 Profile. International Telecommunication Union. Dated Jun. 2006.
Series H: Audiovisual and Multimedia Systems; Infrastructure of audiovisual services—Coding of moving video; Advanced video coding for generic audiovisual services. H.264. Version 1. International Telecommunication Union. Dated May, 2003.
Series H: Audiovisual and Multimedia Systems; Infrastructure of audiovisual services—Coding of moving video; Advanced video coding for generic audiovisual services. H.264. Version 3. International Telecommunication Union. Dated Mar. 2005.
Steliaros, Michael K., et al.; "Locally-accurate motion estimation for object-based video coding", SPIE vol. 3309, 1997, 11 pp.
Stiller, Christoph; "Motion-Estimation for Coding of Moving Video at 8 kbit/s with Gibbs Modeled Vectorfield Smoothing", SPIE vol. 1360 Visual Communications and Image Processing 1990, 9 pp.
Strobach, Peter; "Tree-Structured Scene Adaptive Coder", IEEE Transactions on Communications, vol. 38, No. 4, Apr. 1990, 10 pp.
Sye-Hoon Oh, et al. "An Adaptive Sharpening Filter Using Quantization Step Size and Pixel Variance in H.264/AVC", Consumer Electronics (ICCE), IEEE International Conference on Jan. 9, 2011.
Tanaka et al., A New Combination of 1D and 2D Filter Banks for effective Multiresolution Image Representation, ICIP, 2008, pp. 2820-2823, IEEE.
Tanaka et al., An adaptive extension of combined 2D and 1D directional filter banks, Circuits and Systems, 2009. ISCAS 2009. IEEE International Symposium on, On pp. 2193-2196.
Video denoising; http://en.wikipedia.org/wiki/Video_denoising.com. Feb. 2012.
VP6 Bitstream & Decoder Specification. Version 1.02. On2 Technologies, Inc. Dated Aug. 17, 2006.
VP6 Bitstream & Decoder Specification. Version 1.03. On2 Technologies, Inc. Dated Oct. 29, 2007.
VP8 Data Format and Decoding Guide. WebM Project. Google On2. Dated: Dec. 1, 2010.
Wenger et al.; RTP Payload Format for H.264 Video; The Internet Society; Feb. 2005.
Ebrahimi, Touradj, et al.; "Joint motion estimation and segmentation for very low bitrate video coding", SPIE vol. 2501, 1995, 12 pp.
International Report on Patentability in related matter PCT/US2012/055386.
Soon Hie Tan et al., "Classified Perceptual Coding with Adaptive Quantization", IEEE Transactions on Circuits and Systems for Video Technology, IEEE Service Center, Piscataway, NJ, US, vol. 6, No. 4, Aug. 1, 1996.
Dai, Jingjing, et al., "Film Grain Noise Removal and Synthesis in Video Coding", 2010 IEEE, pp. 890-893.
Wu, Xiaolin, et al., "Calic-A Context based Adaptive Lossless Image Codec", 1996 IEEE International Conference, vol. 4, 4 pp.
Mohammed, Aree A., et al., "Adaptive Quantization for Video Compression in Frequency Domain", Retrieved from the internet <URL http://www.univsul.org/Dosekan_Mamostakan_U/acs15.pdf>.

(56) References Cited

OTHER PUBLICATIONS

Raza, Zahir, "Design of Sample Adaptive Product Quantizers for Noisy Channels", IEEE Transactions on Communications, vol. 53, No. 4, Apr. 2005, pp. 576-580.

Wiegand et al, "Overview of the H 264/AVC Video Coding Standard," IEEE Transactions on Circuits and Systems for Video Technology, vol. 13, No. 7, pp. 568, 569, Jul 1, 2003.

Wiegand, Thomas, Study of Final Committee Draft of Joint Video Specification (ITU-T Rec. H.264 | ISO/IEC 14496-10 AVC), Joint Video Team (JVT) of ISO/IEC MPEG & ITU-T VCEG (ISO/IEC JTC1/SC29/WG11 and ITU-T SG16 Q.6), JVT-F100, Dec. 5, 2002.

Wiegand, Thomas, et al.; "Rate-Distortion Optimized Mode Selection for Very Low Bit Rate Video Coding and the Emerging H.263 Standard", IEEE Transactions on Circuits and Systems for Video Technology, vol. 6, No. 2, Apr. 1996, 9 pp.

Wright, R. Glenn, et al.; "Multimedia—Electronic Technical Manual for ATE", IEEE 1996, 3 pp.

Zhang, Kui, et al.; "Variable Block Size Video Coding With Motion Prediction and Motion Segmentation", SPIE vol. 2419, 1995, 9 pp.

Zhi Liu, Zhaoyang Zhang, Liquan Shen, Mosaic Generation in H.264 Compressed Domain, IEEE 2006.

* cited by examiner

8(A): SCALAR QUANTIZATION

8(B): SCALAR QUANTIZATION WITH USE OF ADAPTIVE DEAD-ZONE

APPARATUS AND METHODOLOGY FOR A VIDEO CODEC SYSTEM WITH NOISE REDUCTION CAPABILITY

TECHNICAL FIELD

This application relates to noise reduction in digital image and video compression, and more particularly to noise reduction apparatus and method(s) for use within image and video codec(s).

BACKGROUND

The amount of data representing media information such as still image and video image can be extremely large. Further, transmitting digital video information over networks can consume large amounts of bandwidth. The cost of transmitting data from one location to another is a function of number of bits transmitted per second. Typically, higher bit transfer rates are associated with increased cost. Higher bit rates also progressively add to required storage capacities of memory systems, thereby increasing storage cost. Thus, at given quality level, it is much more cost effective to use fewer bits, as opposed to more bits, to store digital images and videos.

It is therefore desirable to compress media data for recording, transmitting and storing. For a typical compression scheme, the general result is that achieving higher media quality requires more bits used, which, in turn, increases cost of transmission and storage. Moreover, while lower bandwidth traffic is desired so is higher quality media. Existing systems and methods have limited efficiency and effectiveness.

A codec is a device capable of coding and/or decoding digital media data. The term codec is derived from a combination of the terms code and decode, or compress and decompress. Codecs can reduce number of bits required to transmit signals thereby reducing associated transmission costs. A variety of codecs are commercially available. Generally speaking, for example, codec classifications include discrete cosine transfer codecs, fractal codecs, and wavelet codecs.

In general, lossless data compression amounts to reducing or removing redundancies that exist in data. Further, media information can be compressed with information loss even if there are no redundancies. This compression scheme relies on an assumption that some information can be neglected. Under such a scheme, image and video features which the human eye is not sensitive to are removed and features that the eye is sensitive to are retained.

Most video compression techniques and devices employ an encoding scheme based on motion compensation and transformation. For example, according to a general process of encoding video information, a digital video signal undergoes intra prediction or inter prediction using motion compensation to produce a residual signal, then the residual signal is converted to transform coefficients using a transform algorithm, following which the transform coefficients are quantized, and then entropy encoding, such as variable length coding, or arithmetic coding, is performed on the quantized transform coefficient as well as coding modes and motion vectors used in intra prediction or motion compensation phase. To decode, an entropy decoder converts compressed data from an encoder to coding modes, motion vectors, and quantized transform coefficients. The quantized transform coefficients are inverse-quantized and inverse-transformed to generate the residual signal, and then a decoded image is reconstructed by compositing the residual signal with a prediction signal using coding modes and motion vectors, and stored in memory. At a given bit rate, the amount of difference between video input and reconstructed video output is an indication of quality of compression technique. The highest quality technique would yield signal reconstruction closest to the original video input.

Presence of noise in a media signal can have significant impact on compression efficiency. As noise is random, it is typically hard to compress because of lower predictability or redundancy. Noise can be introduced into media signals from one or more sources. For example, artifacts can originate from imaging and recording equipment, from environmental circuitry, from transmission equipment, from communication channels, or from codecs.

SUMMARY

The following presents a simplified summary of the specification in order to provide a basic understanding of some aspects of the specification. This summary is not an extensive overview of the specification. It is intended to neither identify key or critical elements of the specification nor delineate the scope of any particular embodiments of the specification, or any scope of the claims. Its sole purpose is to present some concepts of the specification in a simplified form as a prelude to the more detailed description that is presented in this disclosure.

Systems and methods disclosed herein relate to enhancing encoding and/or decoding of media content. A noise representation component generates a noise energy spectrum that is represented by a first set of transform coefficients. A quantization component is configured to adaptively change dead-zones of quantization based on the noise energy spectrum, and dead-zones are used to suppress noise associated with one or more captured image frames.

The following description and the drawings set forth certain illustrative aspects of the specification. These aspects are indicative, however, of but a few of the various ways in which the principles of the specification may be employed. Other advantages and novel features of the specification will become apparent from the following detailed description of the specification when considered in conjunction with the drawings.

BRIEF DESCRIPTION OF THE DRAWINGS

Numerous aspects, embodiments, objects and advantages of the present invention will be apparent upon consideration of the following detailed description, taken in conjunction with the accompanying drawings, in which like reference characters refer to like parts throughout, and in which.

DETAILED DESCRIPTION

Figure 1:
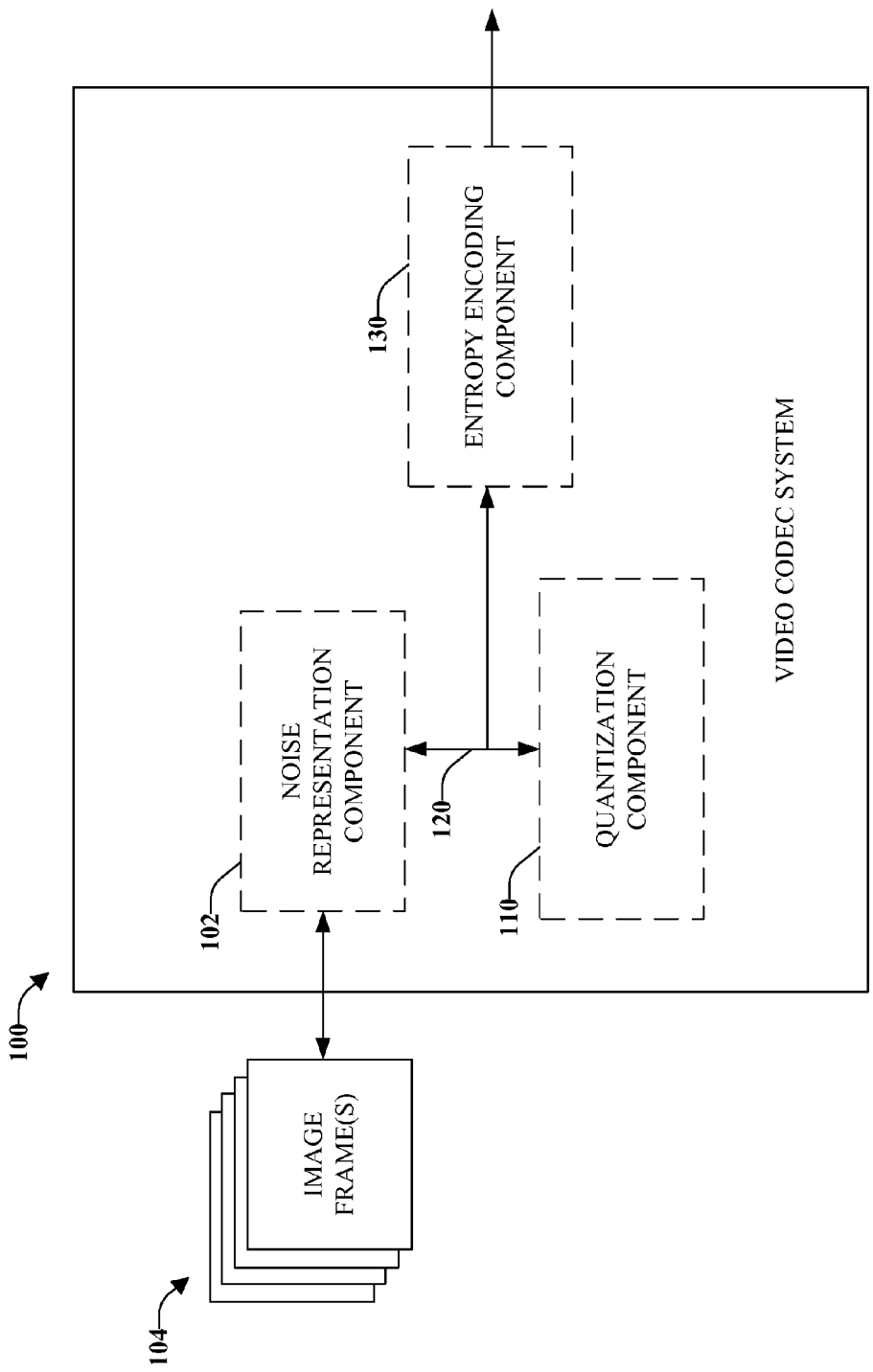
FIG. 1 illustrates a high-level functional block diagram of an example media codec system.

Various aspects or features of this disclosure are described with reference to the drawings, wherein like reference numerals are used to refer to like elements throughout. In this specification, numerous specific details are set forth in order to provide a thorough understanding of this disclosure. It should be understood, however, that certain aspects of disclosure may be practiced without these specific details, or with other methods, components, materials, etc. In other instances, well-known structures and devices are shown in block diagram form to facilitate describing the subject disclosure.

Codecs are generally utilized to encode and/or decode information through compression and decompression. Systems and methods disclosed herein provide noise reduction in image or video objects that use circuitry and/or instructions stored or transmitted in a computer readable medium in order to provide improved compression, image quality and/or system efficiency. Also, embodiments of the media codec disclosed herein can synthesize noise during decompression of data.

Systems and methods disclosed herein relate to enhancing encoding and/or decoding of media content. A noise representation component generates a noise energy spectrum. The noise energy spectrum can be represented by a first set of transform coefficients. In exemplary embodiments, dead-zones are used to suppress noise associated with one or more captured image frames. A dead-zone is a range used in a quantization process where transform coefficient(s) within the dead-zone are assigned a quantization coefficient of zero. A quantization component is configured to adaptively change dead-zones of quantization based on the noise energy spectrum.

The transform coefficients representation of noise energy can be applied to adaptively change dead-zone(s) in quantization of image pixel blocks, e.g., to adaptively change a threshold of a dead-zone to identify and suppress noise in image frames. Further, the transform coefficient representation of noise energy spectrum can be applied to synthesize noise during decoding, e.g., for adding noise back to reconstructed image pixel blocks.

The following is a brief overview of an embodiment of the disclosed subject matter. In this embodiment, a codec is employed to encode and/or decode media information as follows. An image frame is scanned and flat regions of luminance and flat regions of chrominance within the image frame are identified. The flat regions are then represented as matrices of luminance and chrominance pixel values. The term "flat" is used herein to generally describe regions that have little variations, e.g., regions of an image frame where luminance pixel values or chrominance pixel values do not change much (within each of the chroma or luma channels). Thus, variances in the luminance or chrominance pixel values in an identified flat region are considered a result of noise. A transform is applied to the flat regions to generate a set of transform coefficients representing noise.

Noise can be identified via other methods and apparatuses. For example, a device can be calibrated and a set of transform coefficients associated with noise can be derived based to the information received from the calibration.

To encode an image frame, the codec can divide the frame into a plurality of areas, for example, macroblocks, and each macroblock can be further divided into luma blocks and chroma blocks, representing luminance values of image pixels and chrominance values of image pixels, respectively. Each luma and chroma block can be transformed, e.g., using the same technique that was used to transform the identified flat regions, to generate a set of transform coefficients.

Subsequently, a set of transform coefficients associated with a block can be quantized in a quantization process. The quantization process can represent transform coefficients in a plurality of quantization levels as quantized coefficients.

Accordingly, a set of transform coefficients representing noise can be used during quantization of a corresponding set of transform coefficients representing a block. For example, a set of transform coefficients representing noise in the luma channel can be used when quantizing a set of transform coefficients representing a luma block.

For example, a transform coefficient from a set of transform coefficients representing noise can be applied to adaptively change a dead-zone of quantization. The dead-zone of quantization can correspond to the transform coefficient of a set of transform coefficients associated with a block. In one aspect, the transform coefficient associated with noise can be used as a threshold such that any corresponding transform coefficient less than the threshold is quantized to zero. In an addition or alternative aspect, a function of the transform coefficient from the set of transform coefficients associated with noise can used as a threshold of a dead-zone of quantization.

During inverse quantization, a similar process can use the transform domain representation of noise to synthesize noise into corresponding output. For example, a transform coefficient associated with noise can adaptively change a dead-zone of inverse quantization for a corresponding transform coefficient In one aspect, when a quantized coefficient associated with an image block is 0, the inverse quantization process can assign the value of a corresponding transform coefficient from the noise representation as the de-quantized transform coefficient. Re-introduction of noise into image data is sometimes desirable for quality purposes (e.g., introduce texture into image frames, soften images, or make other artifacts less noticeable).

Figure 2:
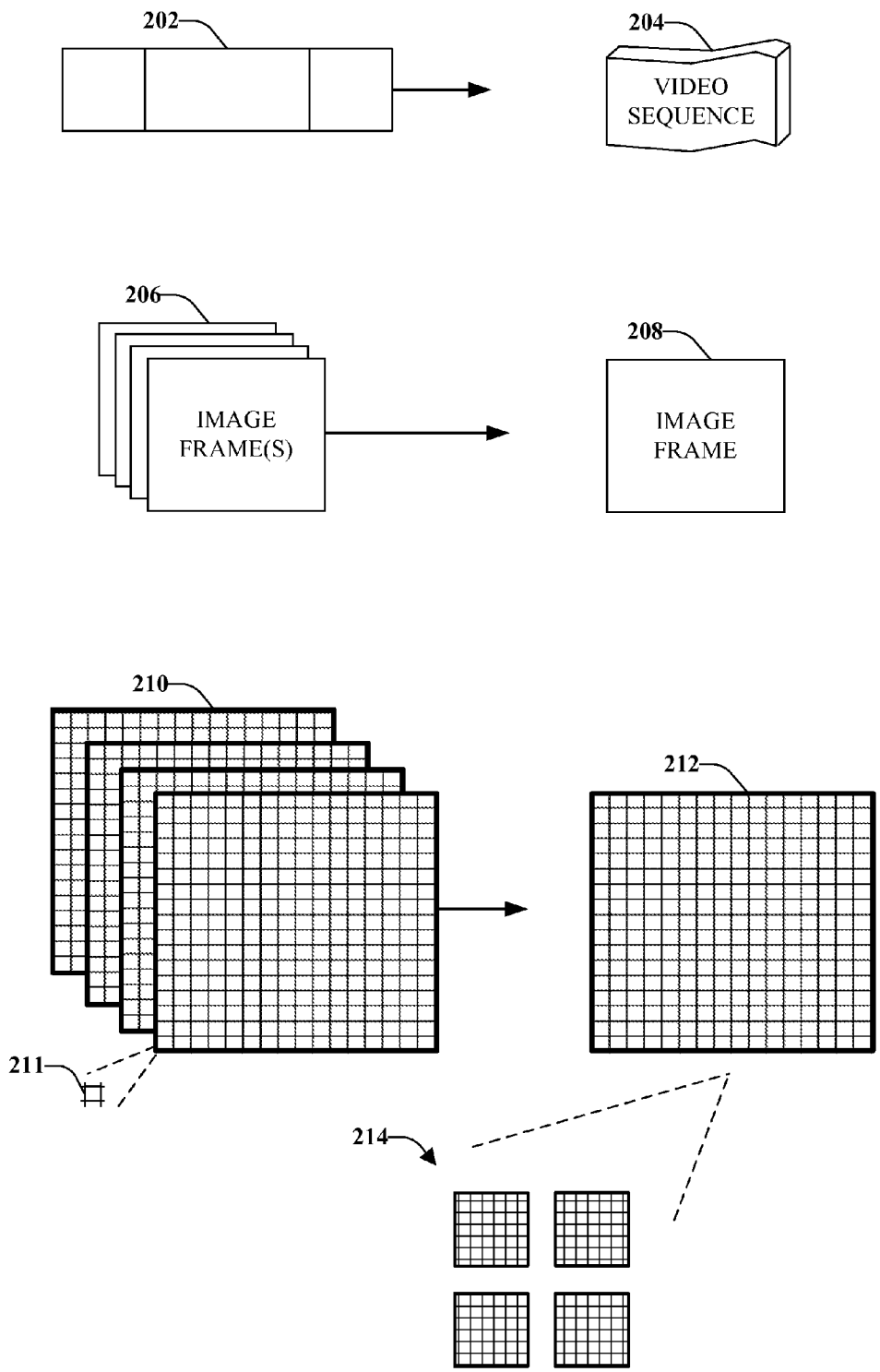
FIG. 2 illustrates an exemplary organization of media information in accordance with various aspects of the disclosed subject matter.

Referring now to FIG. 1 with reference to FIG. 2, there is illustrated a non-limiting exemplary embodiment of a video codec system 100 that provides noise reduction, according to an aspect of this disclosure. Specifically, the system 100 can provide noise reduction that can be utilized prior to, during, or after encoding. Codecs can be employed by various systems, for example, image and video capturing systems, media player systems, televisions, cellular phones, personal data assistants, gaming systems, computing devices, and the like. System 100 can include a noise representation component 102 that receives image frame(s) 104, e.g., input video signals represented as a series of image frames.

Turning briefly to FIG. 2, a video input 202 can be divided into video sequence(s) 204. The video sequence 204 can be further represented by a set of image frames 206. An image frame 208 from the set of image frames 206 is divided into sets of individual image pixels values arranged in blocks or matrices, for example, as a set of macroblocks 210. Each macroblock 212 of the set of macroblocks 210 is represented as a set of image pixels 211. Each macroblock 212 from the set of macroblocks 210 can consist of a plurality of smaller blocks 214. The blocks 214 can be one or more, N×M blocks of luma pixels (Y), representing luminance, and one or more, P×I blocks of chroma pixels (U,V), representing chrominance, wherein N, M, P and I are all integers and x represents multiplication. In one non-limiting example, the integers are typically multiples of 4 but need not be. Likewise, N and M can be the same integer, P and I can be the same integer, and N, M, P and I can all be the same integer. In one embodiment, the macroblock 212 can consist of one block of 16×16 luma pixels and two blocks of 8×8 chroma pixels. In another embodiment, a block of luma pixels can be a 16×8 pixel block, for example. Further, the blocks can be divided or grouped in other combinations (e.g., a 16×16 luma block can be represented as a set of sixteen 4×4 luma blocks).

Continuing now with reference to both FIGS. 1 and 2, system 100 utilizes macroblock 212 in image frame 208 to determine noise within the image frame 208 or a set of image frames 206. However, it is to be appreciated that noise representation component 102 can receive noise information from additional sources, such as a calibration component or memory, for example. The determined noise, for example, can correspond to identified flat regions. For instance, noise representation component 102 can determine variances in luma and/or chroma blocks which are associated with macroblock 212. Each macroblock 212 of a set of macroblocks 210 can have associated luma and chroma variances. Accordingly, a macroblock 212 with a low luma variance can be selected as a flat luma region and a macroblock 212 with low chroma variance can be selected as a flat chroma region. In one aspect, the flat region is a portion of an image that is uniform, substantially uniform, or at least uniform in comparison to other blocks. Further, the uniformity can be in luma channel(s) or in chroma channel(s).

Moreover, luma and chroma image pixel blocks associated with the same location can be identified as being flat independently and irrespectively of each other. For example, a macroblock can have a corresponding low variance chroma block and a high variance luma block, such that the chroma block can be identified as a flat region independently of the luma block.

In an embodiment, flat regions are identified based on comparison of variances associated with blocks of an image frame 208 (e.g. the lowest 3% of variances can represent the flat regions). Further, comparison of variances can be configured to different percentage ranges based on a specific device, electronic noise, whether it corresponds to the chroma or luma channel, and/or upon specific video information qualities, for example. As an example, a particular computer video recorder may use the lowest 5% of variances to identify a flat region while a particular cell phone video recorder may use the lowest 10% of variances to identify a flat region.

In one embodiment, noise can be determined for a set of frames 206 in a video sequence 204. Noise representation component 102 can examine the set of frames 206 and can identify corresponding flat regions. Further, noise representation component 102 can use identified flat luma regions in the set of frames 206 to generate a luma noise spectrum associated with the entire set of frames. Likewise, noise representation component 102 can use a-identified flat chroma regions of the set of frames 206 to generate a chroma noise spectrum corresponding to the entire set of frames. Thus, noise representation component 102 can generate a general luma noise spectrum corresponding to the set of frames 206 and can generate a general chroma noise spectrum corresponding to the set of frames 206.

However, it is to be understood and appreciated that different noise identification techniques can be applied to the chroma and luma channels and remain within the scope of certain embodiments of this disclosure. For example, noise representation component 102 can be configured to generate a chroma channel noise spectrum associated with the entire set of frames 206 and a separate luma channel noise spectrum for each individual frame 208 of the set of frames 206.

It is also to be understood and appreciated that a flat region can be determined based upon other characteristics or methods, for example, comparison of averages and manual selection. Further, it is to be understood and appreciated that a determined noise spectrum can be stored in memory and can also be applied to disparate videos and image frames.

Additionally or alternatively, noise information can be provided via a calibration component. For example, an image capturing device can be calibrated such that noise information can be deduced based on the calibration information that can be provided to the system 100 via a calibration component (not shown). When calibration information is received, in one embodiment, the noise representation component 102 can identify noise based on the calibration information. Alternatively, the noise representation component 102 can determine a noise spectrum to be used based on the noise information from calibration and/or the noise information from identified flat regions.

The calibration can be automated, such as implemented by a processor running computer executable instructions, can be manual, or can be implemented as a combination of automated and manual calibration. Further, an electronic device can be individually calibrated based, at least in part, on equipment noise. The calibration information can be stored in memory and can be applied to disparate videos and still image frames. In one embodiment, noise information can be calibrated according to a background. For example, a camera can capture an image of a sheet of plain white paper and the luma and/or chroma variance within the captured image can be utilized to generate a noise energy spectrum. It is to be appreciated that any suitable flat background can be utilized. Moreover, it is to be further appreciated that the luma and chroma channels can all be calibrated independent of one and other, or alternatively, can be calibrated in connection with each other. Thus, in one embodiment, system 100 generates a noise energy spectrum according to a controlled background.

In certain embodiments, calibration can be associated with chroma or luma values. For example, calibration can be different in light areas as opposed to dark areas, and calibration can vary according to color values. Many other media characteristics can affect calibration (e.g., motion characteristics, metadata, resolution). In one embodiment of system 100, noise representation component 102 utilizes the identified flat regions, or regions according to the calibration information, and applies a transform to the corresponding luma and/or chroma block(s), to generate noise energy spectrum(s) represented as a set of transform coefficients ("transform domain representation of noise").

Any suitable transform or set of transforms can be utilized (e.g., DCT, DFT, DHT, HCT). In an aspect, the transform (or set of transforms) applied to the noise is the same or similar transform (or set of transforms) used in system 100 for transform based encoding. Accordingly, the noise representation component 102 associates a set of transform coefficients with each identified luma noise block and each identified chroma noise block.

In one implementation, an input image frame 208 of the set of image frames 206 is divided into a set of macroblocks 210. Each macroblock 212 of the set of macroblocks 210 may consist of a 16×16 luma block and two 8×8 chroma blocks. Further, each macroblock is divided into a set of sixteen 4×4 luma blocks and two sets of four 4×4 chroma blocks. In one aspect, an orthogonal transform can be applied to each block, for example, a discrete cosine transform (DCT). The transform can de-correlate the blocks into sets of transform coefficients. A 2D-DCT can be applied to 4×4 luma blocks and 4×4 chroma blocks, for example. When a transform is applied to the blocks representing noise, the noise energy spectrum can be represented as a set or matrix of transform coefficients ("transform domain representation of noise"). Additionally or alternatively, N transforms can be utilized (as discussed below).

Figure 3:
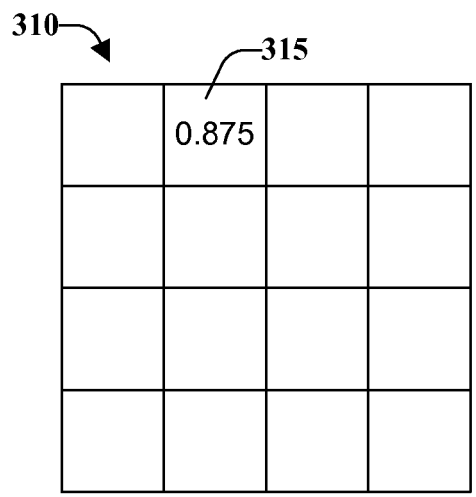
FIG. 3 illustrates an example transform domain noise spectrum and corresponding transform of an image block.
Figure 3:
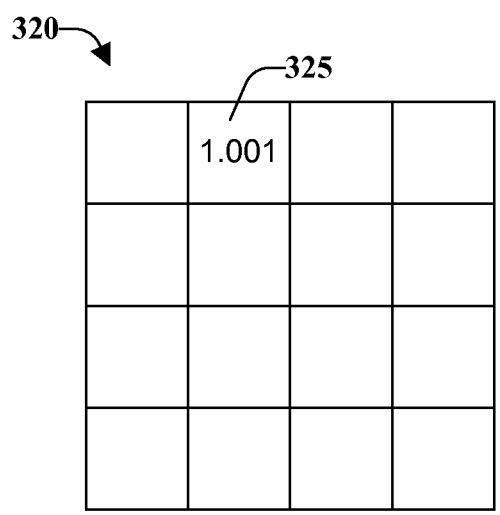
Figure 4:
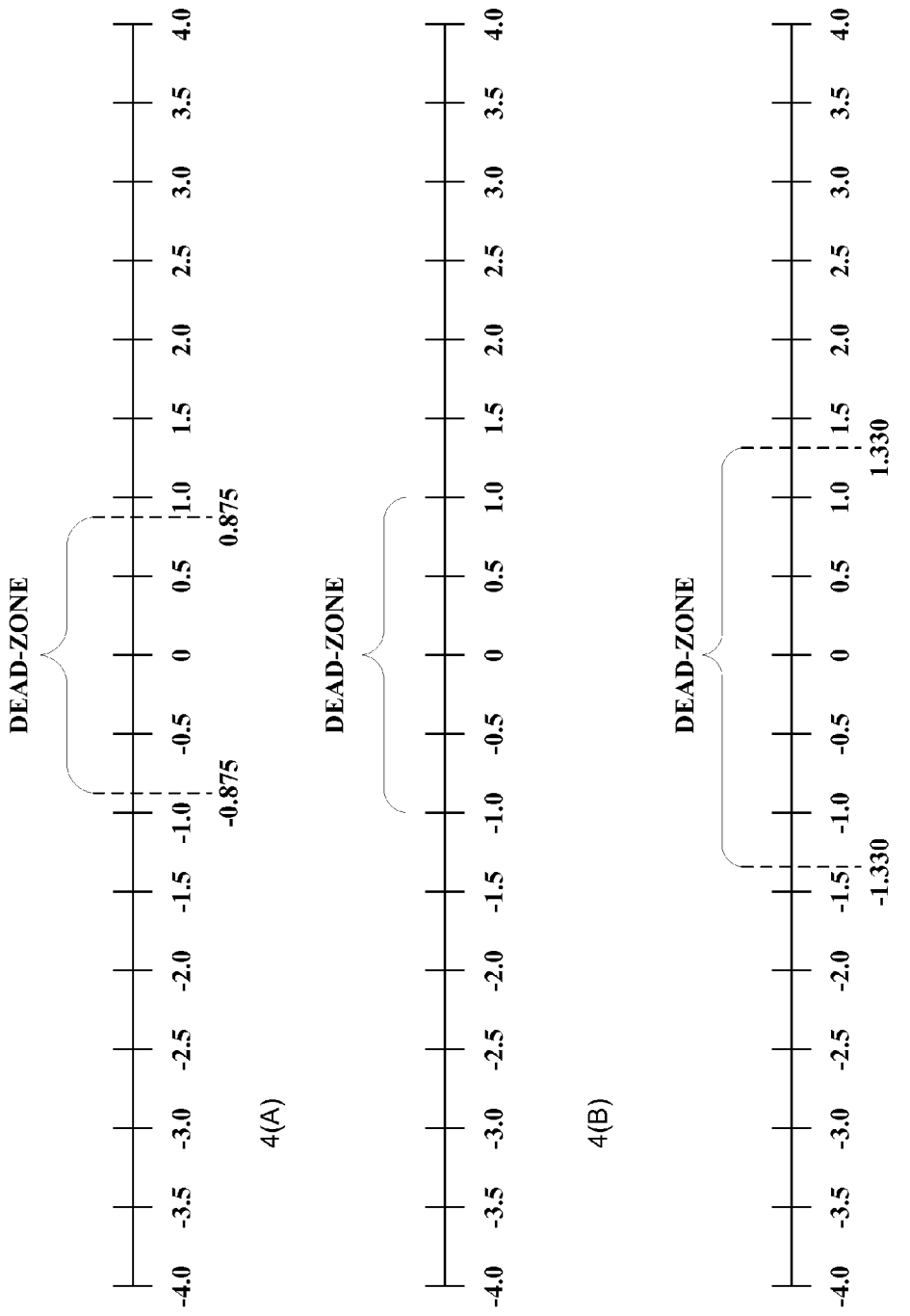
FIG. 4 illustrates an example graphical view of various quantization techniques.

Now discussing FIG. 1 in combination with FIGS. 3 and 4, quantization component 110 adaptively changes dead-zones of quantization for sets of transform coefficients related to image blocks according to sets of transform coefficients representing noise. The transform domain representation of noise can be communicated to quantization component 110, e.g., via system bus 120. Quantization component 110 can adaptively change a dead-zone of quantization of each coefficient of a set of transform coefficients according to a transform coefficient representing noise of a set of transform coefficients representing noise to facilitate suppressing noise in connection with encoding the input image frame(s) 104.

For example, FIG. 3 depicts block 310 as a 4×4 block of transform coefficients representing noise and depicts block 320 as a 4×4 block of transform coefficients associated with an input block. For brevity, only the transform coefficient values at position 315 of block 310 and position 325 of block 320 are depicted. Further, it is to be appreciated that values at position 315 and 325 are arbitrary and non-limiting examples. In this example, the transform coefficient at position 315 represents a transform coefficient associated with noise and the transform coefficient at position 325 represents a corresponding transform coefficient associated with an input block. A dead-zone of quantization can be adaptively changed based on the value of position 315 as seen in the various examples illustrated in FIG. 4.

Quantization component 110 can perform quantization on a set of transform coefficients, e.g., transform coefficients corresponding to an input block. Quantization component 110 can read a finite list of K symbols and can modify each symbol according to a scaling or quantization factor (quantizer), thus transforming the transform coefficients into a set of discrete quantum values (commonly referred to as quantized transform coefficients, or quantization levels). For example, quantization of K symbols can be accomplished with X quantization levels in a scalar quantization process, where X is an integer, e.g., X=128. Accordingly, transform coefficient(s) greater than or equal to 0 and less than or equal to 10 may be rounded to 0, a transform coefficient greater than but not equal to 10 and less than or equal to 20 may be rounded to 1, and so on.

However, it is to be appreciated that the quantization technique can change for different channels, regions, frequencies, or frames. Thus, different quantization methods can be applied to the transform coefficients, and each coefficient corresponding to luma channels can have a distinct quantization method, likewise, each quantized coefficient corresponding to chroma channel can also have a separate quantization method. For example, different levels of quantization can be associated with a $1^{st}$ order luma DC, $1^{st}$ order luma AC, $2^{nd}$ order luma DC, $2^{nd}$ order luma AC, chroma DC, and chroma AC.

As another example, a "dead-zone" can be applied to the quantization process. The quantization component 110 can apply a dead-zone such that anything in the dead-zone is quantized to zero. The dead-zone may not equal the quantizer. For example, the quantization component 110 can apply a quantizer of 10 (any value between 0 and 10 can be set to zero) and apply a dead-zone of 12, thereby setting the quantized coefficient of a transform coefficient to 0 for transform coefficients between 0 and 12.

In an aspect, the transform domain representation of noise can be used in the quantization process to adaptively change the dead-zone of the quantization of each coefficient within a block. Accordingly, each of the transform coefficients associated with the noise spectrum can be used to determine a threshold for corresponding input transform coefficients. The determined threshold can be applied to the corresponding transform coefficient during quantization. By doing so, the quantization process can suppresses noise in luma and/or chroma channels.

For example, graph 4(A) illustrates an exemplary quantization process where quantization component 110 determines the threshold of quantization, which is determined according to the corresponding transform coefficient associated with noise. Thus, with reference to FIG. 3, the quantization of position 325 is determined by the value of position 315. In this example, the quantization of position 325 would result in a value of 1. It is appreciated that the threshold can be adaptively changed according to a function of the corresponding transform coefficient associated with noise (e.g., a multiple of the corresponding transform coefficient can be designated as the threshold).

In another embodiment, the threshold can depend in part upon the transform domain representation of noise and upon a quantizer. For example, the dead-zone threshold can adaptively change to either of the quantizer or the transform domain representation of noise, depending on a comparison of the threshold and the transform coefficient associated with noise, as illustrated in graph 4(B). Specifically, graph 4(B) in FIG. 4 illustrates a scalar quantization wherein a dead-zone is initially defined by a threshold of −1 to 1. The value of position 315 is between −1 and 1, so the threshold remains defined as −1 to 1. The value of position 325 is 1.001 and is therefore not within the dead-zone of 4(B). Thus the quantization coefficient of position 325 is 1.

The dead-zone threshold may be based on a function of the quantizer and transform coefficient associated with noise, such as equation 1, for example, where N is the transform coefficient associated with noise and Q is the quantizer.

$$\text{Threshold} = \sqrt{N^2 N^2 + Q^2} \qquad \text{Equation 1}$$

For example, graph 4(C) illustrates an exemplary quantization where the threshold of quantization is determined as a function of the corresponding dead-zone threshold according to equation 1 where N=0.875 and Q=1, such that the dead-zone is defined as greater or equal to −1.330 and less than or equal to 1.330. It is to be appreciate that the dead-zone may exclude the threshold limits (e.g., greater than −1.330 and less than 1.330). In this example, the quantization of position 325 would result in a value of 0, as 1.001 is in the dead-zone.

Further, additional information, such as calibration information, for example, can adaptively change the dead-zone threshold in combination with the quantizer or the transform domain representation of noise. Likewise, the method used to determine the dead-zone threshold can depend on specific values associated with the transform domain representation of noise. For example, a function F(p) can be used when the corresponding pixel value is less than a value W, while a function G(p) can be used when the transform domain representation of noise is greater than or equal to W. Such configurations may depend on the specific electronic device, the transform, the quantization process, manual input, or other noise producing factors.

It is to be appreciated that each set of transform domain representations of a chroma channel noise and each set of transform domain representations of a luma channel noise can have quantization threshold values independent of the other channels. For example, encoding of luma channels can utilize quantization thresholds equal to the transform coefficients of noise spectrum in the luma channel while encoding of chroma channels can utilize quantization thresholds of three times the corresponding transform coefficients of noise spectrum of the chroma channel.

Another embodiment utilizes motion prediction and/or motion sensing techniques to apply a threshold to corresponding positions for multiple frames within video information, thereby reducing the noise in corresponding regions of a plurality of frames.

In one embodiment, the transform domain representation of noise is used to suppress noise in an image frame. For example, the quantization component 110 can employ the transform domain representation of noise as a common noise spectrum, thereby suppressing noise in an entire frame, in a plurality of frames or in a plurality of videos.

Quantization component 110 can transmit the quantized transform coefficients to entropy encoding component 130. Entropy encoding component 130 can encode the data in a bit stream, e.g., entropy encoding, and send the bit stream to another device. In another example, entropy encoding component 130 may send data to a buffer may, in turn, send data to be stored in a different memory.

In another aspect of the disclosed subject matter, the individual pixels 211 in a set of macroblocks 210 can be altered from their originally captured values. For example, predicted macroblocks in video encoding can be utilized. That is, inter- or intra-prediction can be applied to a video sequence 204. Image prediction techniques use motion estimation and prediction to generate a prediction macroblock. Thus, noise can be suppressed in the residue macroblock using techniques described above. In another aspect, a predicted macroblock can be employed to determine noise and to generate a noise spectrum.

While FIG. 1 depicts separate components in system 100, it is to be appreciated that the components may be implemented in a common component. For example, noise representation component 102 and quantization component 110 can be included in the entropy encoding component 130. Further, it can be appreciated that the design of system 100 can include other component selections, component placements, etc., to achieve optimal performance, such as inter and intra motion prediction components (for video compression), for example.

Figure 5:
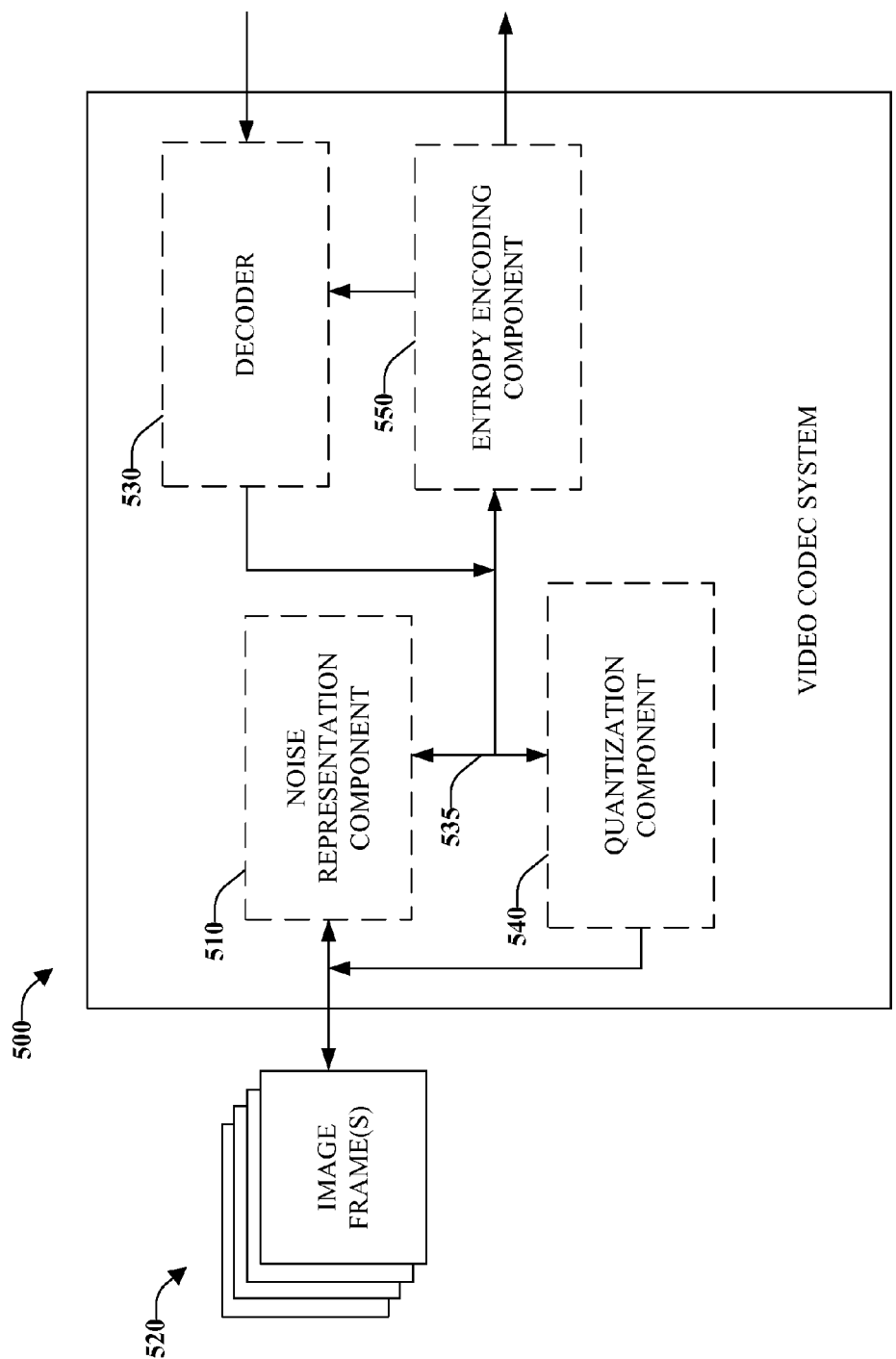
FIG. 5 illustrates a high-level functional block diagram of an example media codec system including a decoder.

Referring now to FIG. 5, there is illustrated a non-limiting exemplary embodiment of a media codec system 500 that provides noise reduction, according to an aspect of this disclosure. Specifically, noise reduction can be accomplished prior to, during or after encoding. In particular, system 500 can include a noise representation component 510 that receives image frame(s) 520 from input media signals, for example, a video captured by a video camera (e.g., a digital video camera, a webcam device, or a camera embedded on a laptop, mobile phone, or a tablet) and represented as a series of image frames. Typically, the image frame is divided into blocks of image pixels, for example, macroblocks.

In a non-limiting exemplary embodiment, system 500 can determine "flat region(s)" within each image frame of the set of image frames 520. The flat regions can be utilized by noise representation component 510 to represent a noise energy spectrum as a set of transform coefficients. Entropy encoding component 550 can encode the set of transform coefficients. The encoded set of transform coefficients can be transmitted to components within system 500 or can be transmitted outside of system 500, for example, transmitted to an output buffer. In one implementation, system 500 includes decoder 530. The decoder 530 can receive a bit stream, e.g., via a bus from memory or from entropy encoding component 550. The bit stream can include encoded data, such as encoded transform coefficients and header data (e.g., data to aid decoding). The encoded data can be utilized by the decoder 530 to generate a series of quantized transform coefficients and other data such as header information, for example. The generated quantized transform coefficients can be transmitted over system bus 535 to quantization component 540.

Quantization component 540 can apply an inverse quantization algorithm to the quantized transform coefficients of image frames, which is inverse in relation to the quantization used to encode. Further, quantization component 540 can utilize the transform domain representation of noise to synthesize noise composited into a set of transform coefficients. The transform domain representation of noise can be utilized by decoder 530 to add or synthesize noise to corresponding dead-zones. Further, an inverse transform algorithm can be applied by decoder 530 or a separate inverse transform component to the set of transform coefficients to generate a decompressed media signal. The transform is inverse in comparison to the transform used in encoding. For example, while a DCT is applied for encoding, an iDCT is applied for decoding.

While FIG. 5 depicts separate components in system 500, it is to be appreciated that the components may be represented in a common component. For example, noise representation component 510 and quantization component 540 can be included in entropy encoding component 550. In another aspect, system 500 can include decoder 530 without encoding component 550. Further, it can be appreciated that the design of system 500 can include different component selections, component placements, etc., to achieve an optimal performance. For example, decoder 530 can include a de-quantization component and an inverse transform component.

Figure 6:
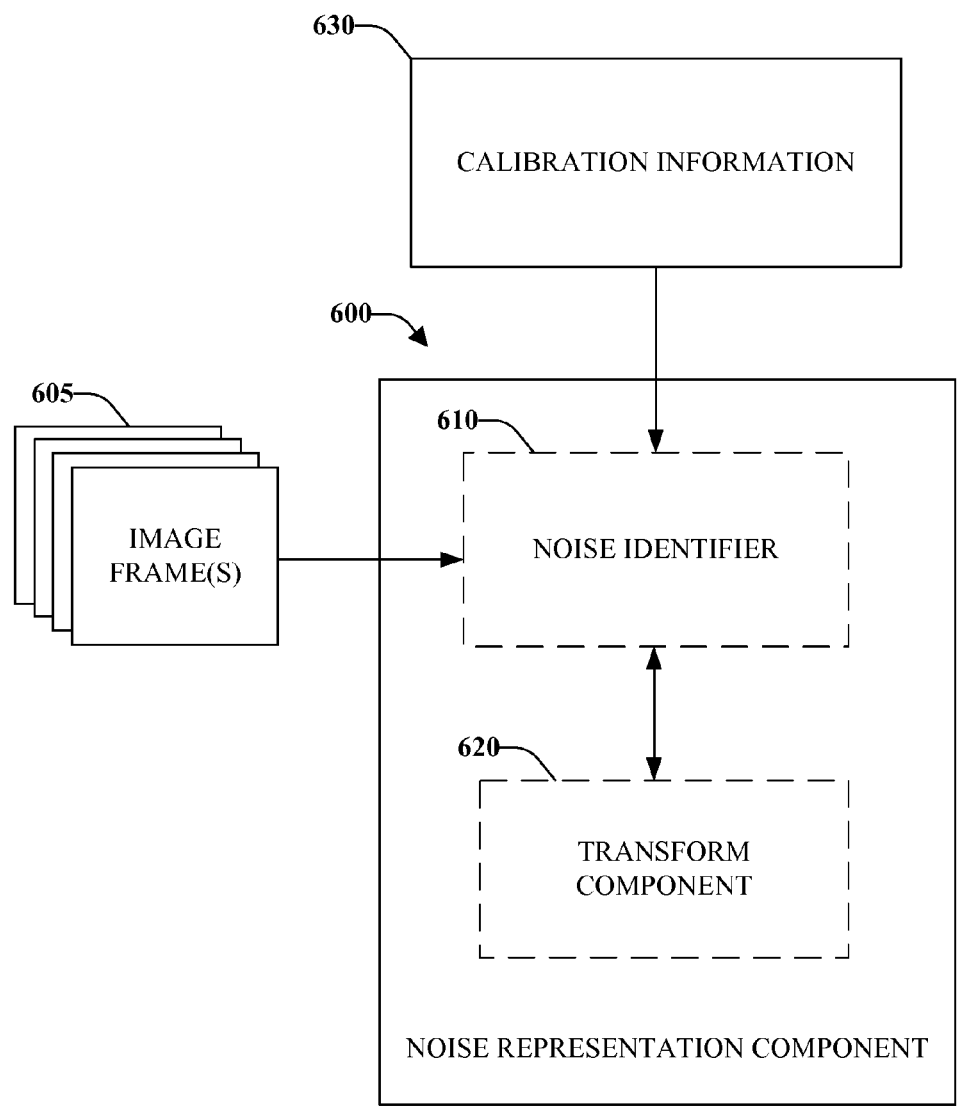
FIG. 6 illustrates a high-level functional block diagram of an example noise representation system.

Now referring to FIG. 6, a non-limiting exemplary embodiment of noise representation component 600 is depicted. In one embodiment, flat region(s) of image frame(s) 605 can be identified by the noise identifier 610 and the transform component 620 can apply a transform algorithm to the identified flat regions. In one aspect, the noise identifier 610 can output blocks of N×M regions, where N and M are integers, and the transform component 620 can apply a transform which can convert (transform) the N×M block to a set of transform coefficients. The specific transform used can depend on the values chosen for N and M. For example, if N and M are both set to be 4, then a transform, capable of processing a 4×4 block can be used, such as a discrete cosine transform (DCT), for example.

It can to be appreciated that noise identifier 610 can identify noise in media information, and alternatively, noise information can be provided via a calibration unit. For example, a media capturing device may be calibrated such that noise during capture of media information can be deduced based on calibration information 630.

Figure 7:
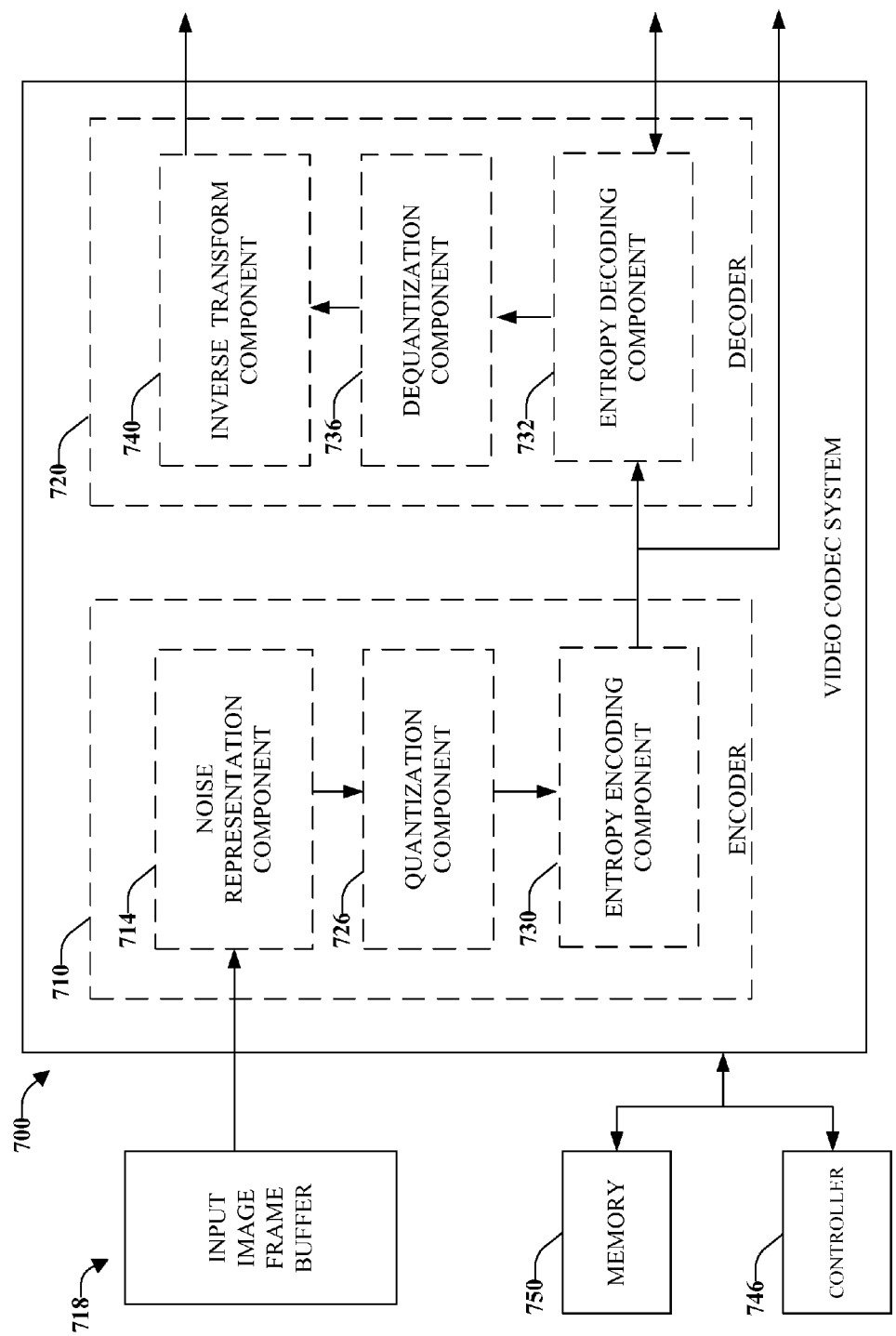
FIG. 7 illustrates an example block diagram for implementation of a media codec system utilizing an input image frame buffer.

FIG. 7 illustrates another non-limiting exemplary embodiment of a media codec system in accordance with this disclosure. In FIG. 7, the system 700 includes an encoder 710 and a decoder 720. Encoder 710 can include noise representation component 714. Noise representation component 714 can receive image frames from an input image frame buffer 718. Although represented as being outside the system 700, input image frame buffer 718 can be contained within system 700. Input image frame buffer 718 can be any form of volatile and/or non-volatile memory. For example, input image frame buffer 718 can include but is not limited to magnetic storage devices (e.g., hard disk, floppy disk, magnetic strips . . . ), optical disks (e.g., compact disk (CD), digital versatile disk (DVD) . . . ), smart cards, flash memory (e.g., single-level cell flash memory, multi-level cell flash memory), ROM, PROM, EPROM, EEPROM, or NVRAM (e.g., FeRAM), or a combination thereof, for example. Further, a flash memory can comprise NOR flash memory and/or NAND flash memory.

Noise representation component 714 identifies noisy regions in input image frames. The noisy regions can be utilized by the noise representation component 714 to generate a set of transform coefficients (transform domain representation of noise). Input image frame buffer 718 can transmit image frames to a transform component (e.g., transform component 620), which can output a set of transform coefficients. The transform coefficients can be quantized by quantization component 726. Quantization component 726 can apply the transform domain representation of noise according to the techniques described above to suppress noise in input image frames.

Entropy encoding component 730 can receive data from quantization component 726 or from components outside of system 700, such as a buffer, for example. In use, entropy encoding component 730 may transmit a bit stream, after entropy encoding (e.g., context-adaptive binary arithmetic coding (CABAC), Context-adaptive variable-length coding (CAVLC)), to decoder 720, and additionally or alternatively may transmit a bit stream to other components such as an external storage device, for example.

In another aspect, besides the encoded quantized coefficients, the bit stream can also contain information to aid decoding, such as motion vectors, quantization information, prediction information and information to synthesize noise.

Further, entropy decoding component 732 can decode a bit stream, e.g., reverse entropy encoding (CABAC, CAVLC), to generate header information and sets of quantized coefficients, for example. The entropy decoding component 732 can transmit a set of quantized transform coefficients to de-quantization component 736. Further, entropy decoding component 732 can determine how to apply additional information encoded in the compressed bit stream, e.g., prediction technique information and noise spectrum information.

In one aspect, decoder 720 can further include a de-quantization component 736 capable of applying an inverse quantization process, which is inverse with respect to the quantization process used by quantization component 726. Further, de-quantization component 736 can use transform domain representations of noise to add noise in de-quantized transform coefficients. Likewise, inverse transform component 740 can apply an inverse transform that is inverse with respect to the transform utilized by the encoder 710 (e.g., transform component 620). Accordingly, inverse transform component 740 can transform a set of transform coefficients to an N×M block which, by itself or in combination with an N×M pre-diction block, represents a portion of an image. For example, an iDCT can transform a set of transform coefficients into a 4×4 residue block representing a portion of a 16×16 luma residue block.

In one aspect, controller 746 can be configured to control system 700 and can be coupled to memory 750. Memory 750 can provide workable space (e.g., RAM, storage space, read/write space) for controller 746. Further, memory 750 can comprise volatile and/or non-volatile memory. In one example controller 746 can comprise one or more processors. The processor(s) can be configured to execute instructions stored in computer readable memory. The processor can transform images into other digital information and identify noise, apply transforms, apply quantization processes, suppress noise and synthesize noise.

FIGS. 8-11 illustrate methodologies and/or flow diagrams in accordance with the disclosed subject matter. For simplicity of explanation, the methodologies are depicted and described as a series of acts. However, acts in accordance with this disclosure can occur in various orders and/or concurrently, and with other acts not presented and described herein. Furthermore, not all illustrated acts may be required to implement the methodologies in accordance with the disclosed subject matter. In addition, those skilled in the art will understand and appreciate that the methodologies could alternatively be represented as a series of interrelated states via a state diagram or events. Additionally, it should be appreciated that the methodologies disclosed in this specification are capable of being stored on an article of manufacture to facilitate transporting and transferring such methodologies to computing devices. The term article of manufacture, as used herein, is intended to encompass a computer program accessible from any computer-readable device or storage medium.

Figure 8:
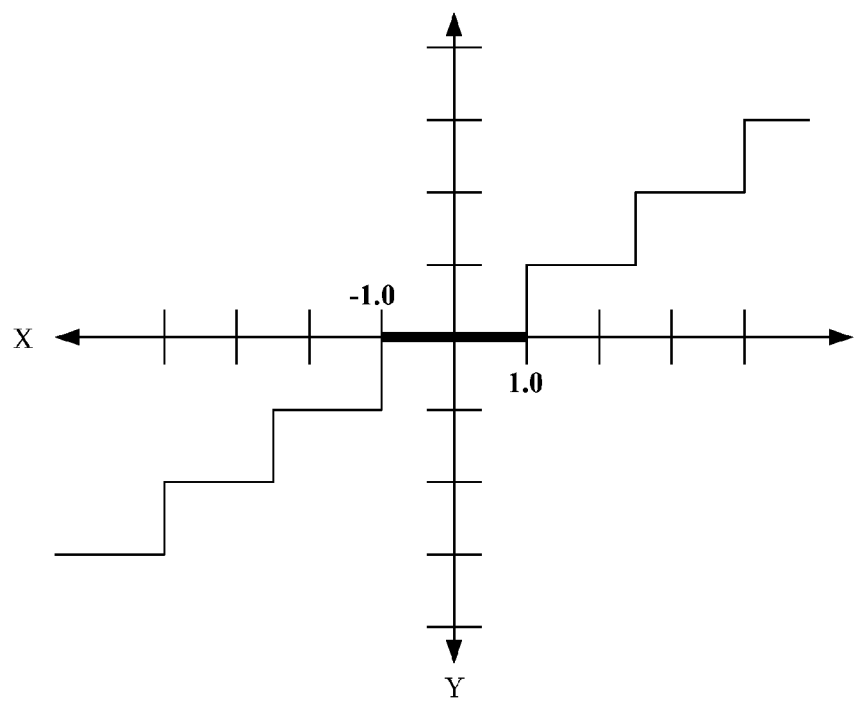
FIG. 8 illustrates an example graphical comparison of a static dead-zone and an adaptive dead-zone.
Figure 8:
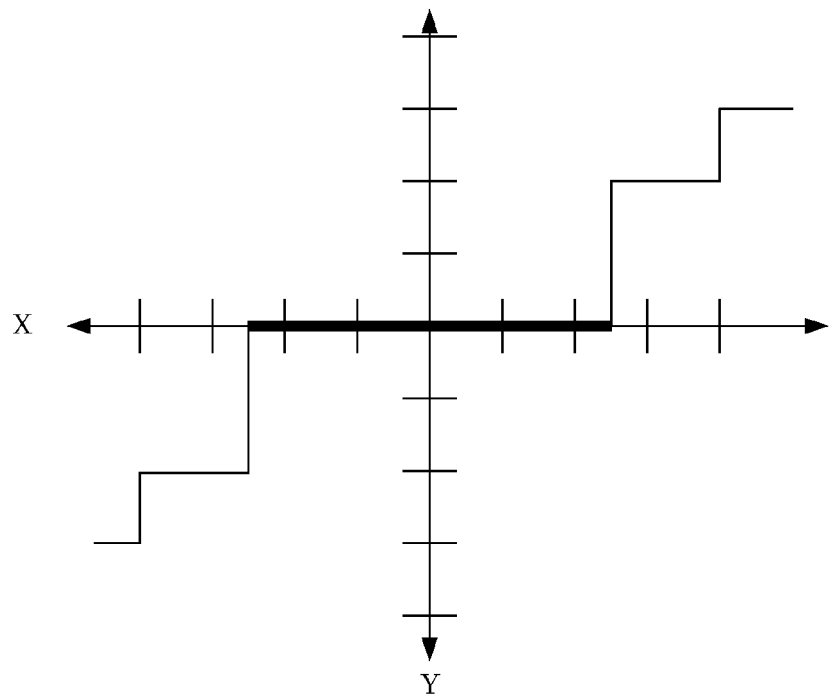

With respect to FIG. 8, illustrated is a non-limiting exemplary graphic description of a scalar quantization that utilizes a dead-zone. Specifically, graph 8(A) depicts the effect of a dead-zone on the relationship between transform coefficients (represented along the x-axis) and quantized transform coefficients (represented along the y-axis), where corresponding transform coefficients between unit −1 and unit 1 on the x-axis have a quantized level of zero on the y-axis.

In comparison, graph 8(B) illustrates the effect of a dead-zone on the relationship between transform coefficients (represented along the x-axis) and quantized transform coefficients (represented along the y-axis). Specifically, the dead-zone is adaptively changed as a result of identified noise. In this example, the dead-zone is larger than that of 8(A). It is to be appreciated, that a larger dead-zone can increase the number of coefficients which are set to zero.

Figure 9:
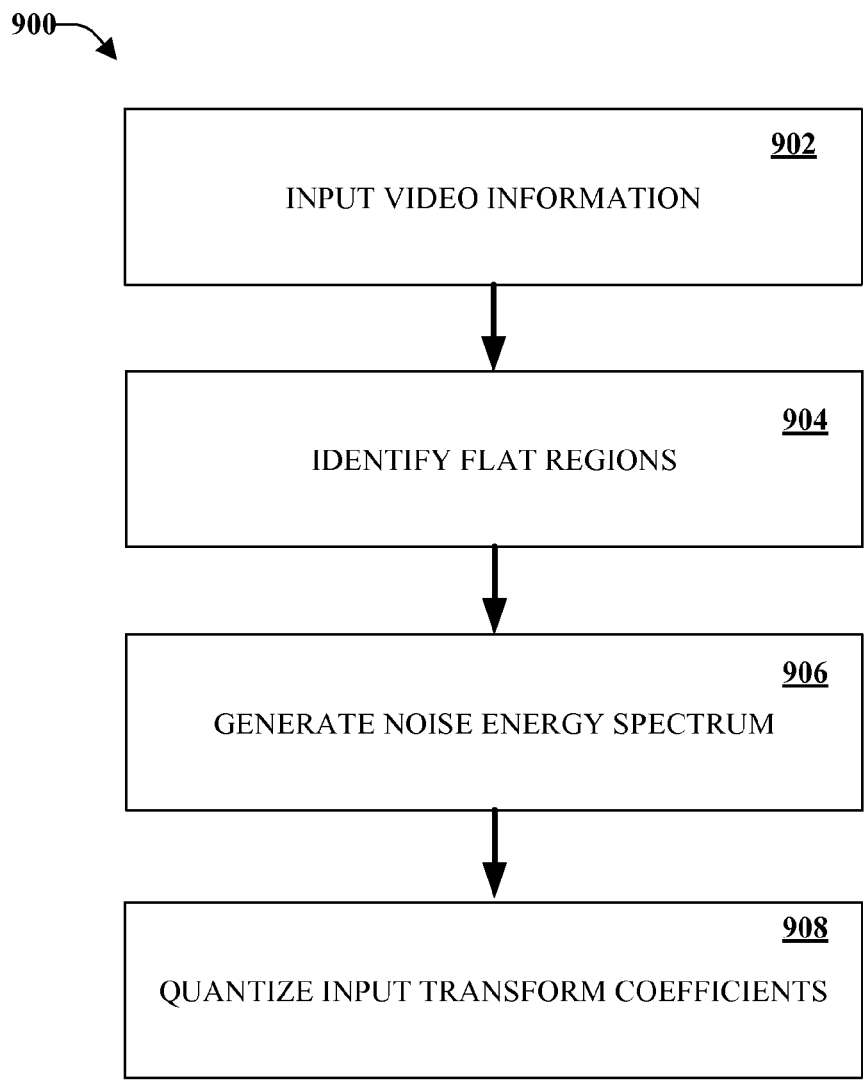
FIG. 9 illustrates an example methodology for suppressing noise while encoding media information.

Referring to FIG. 9, illustrated is a methodology 900 for suppressing noise during compression of media information according to an aspect of the subject innovation. As an example, methodology 900 can be utilized in various codec applications, such as, but not limited to, media capturing systems, media displaying systems, computing devices, cellular phones, tablets, personal data assistants (PDAs), laptops, personal computers, audio/video devices, etc. Moreover, noise suppression is provided to reduce and/or prevent encoding noisy media information (e.g., image frames compressed with noise). Specifically, methodology 900 uses transform domain representation of noise to provide noise reduction in a quantization process.

Initially, video information can be captured or can be contained within memory. At 902, media information (e.g., video information) can be input to an encoder. Typically, video information will be divided into frames, which is further divided into macroblocks. During this time, media information may be contained in memory.

At 904, flat regions of the input media information can be identified (e.g., regions with low or no variance). At 906, the identified flat regions can be represented as a transform coefficient noise energy spectrum.

At 908, the transform domain representation of the noise energy spectrum can be utilized to reduce noise in sets of transform coefficients in corresponding locations of image frames. In one aspect, the transform domain representation of the noise energy spectrum can be used as a threshold for quantization. Alternatively, the threshold for quantization can be a function of the transform domain representation of the noise energy spectrum. Specifically, the threshold can be configured or programmed to depend on a function of, for example, the transform domain representation of the noise energy spectrum, specifications/attributes of a specific device, calibration information, whether the noise energy is associated with chroma or luma channels, and specific quantizer characteristics.

Figure 10:
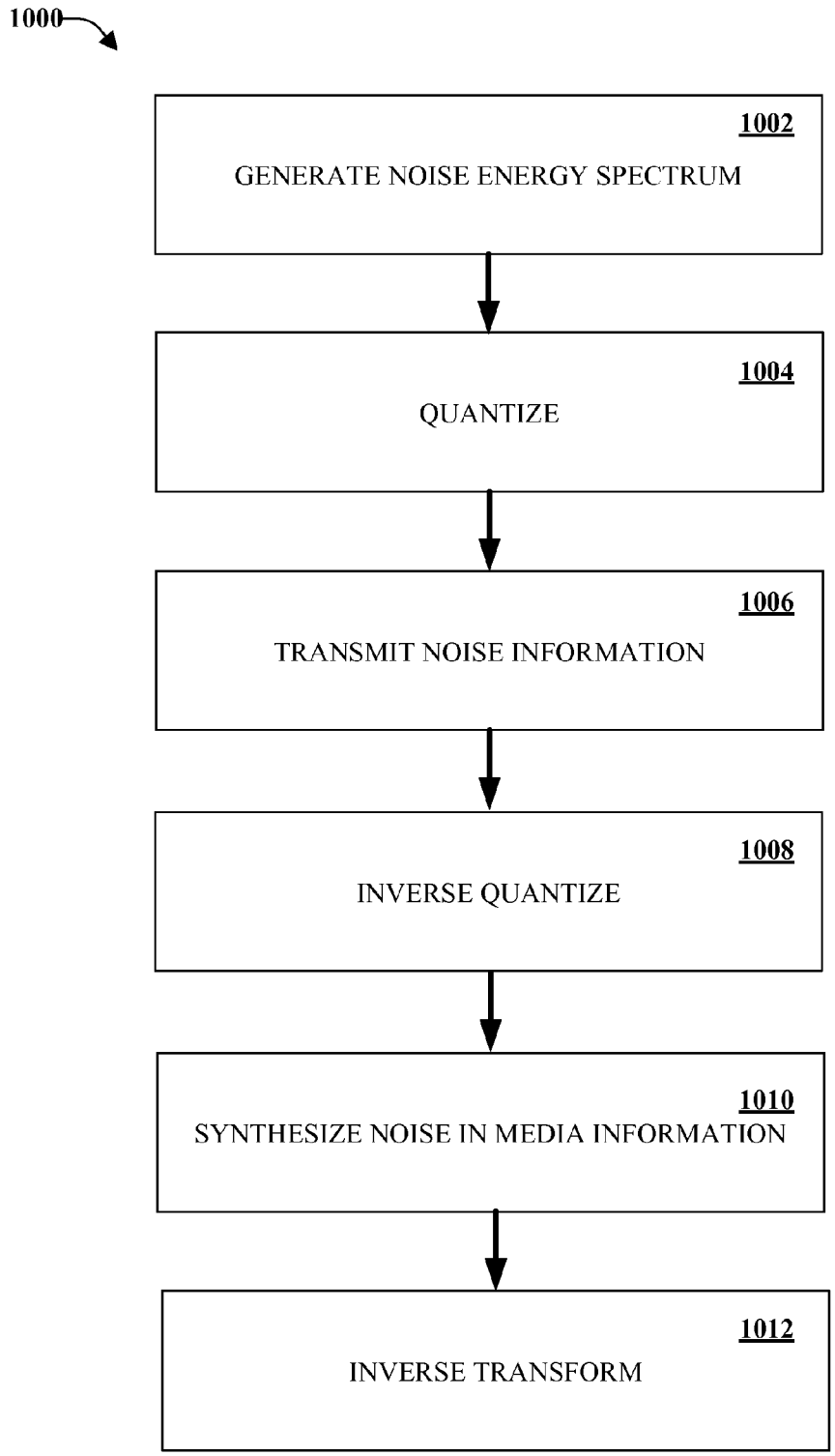
FIG. 10 illustrates an example methodology for suppressing noise while encoding video information and for synthesizing noise while decoding encoded media information.

FIG. 10 illustrates an example methodology 1000 for noise suppression in a media signal in accordance with an aspect of this disclosure. Typically, when noise is removed from a media signal, the noise is discarded. After the transform representation of the noise energy spectrum is generated at 1002, a quantization component can remove noise in media information at 1004. In one example, the transform representation of the noise energy spectrum can be transmitted to a decoder at 1006. In another example, other noise information, such as location or variance, can be transmitted to a decoder. Accordingly, at 1006, the noise information can be transmitted.

At 1008, a decoder applies an inverse quantization to transform coefficients. Further, at 1010, noise can be synthesized in media information. Sometimes it is desirable to add noise back into the media information for purposes such as for example more accurately rendering the original captured information. As an example, a transform representation of the noise energy spectrum can be utilized to synthesize noise in transform coefficients corresponding to the channel (luma or chroma) and locations. Synthesis of noise can depend on whether noise was compressed by location, frame, sets of frames or a complete video.

Further, at 1012, sets of transform coefficients can be inverse transformed. The resulting blocks can be reconstituted to form an image frame. The output information can be stored in memory, for example, an output buffer.

Figure 11:
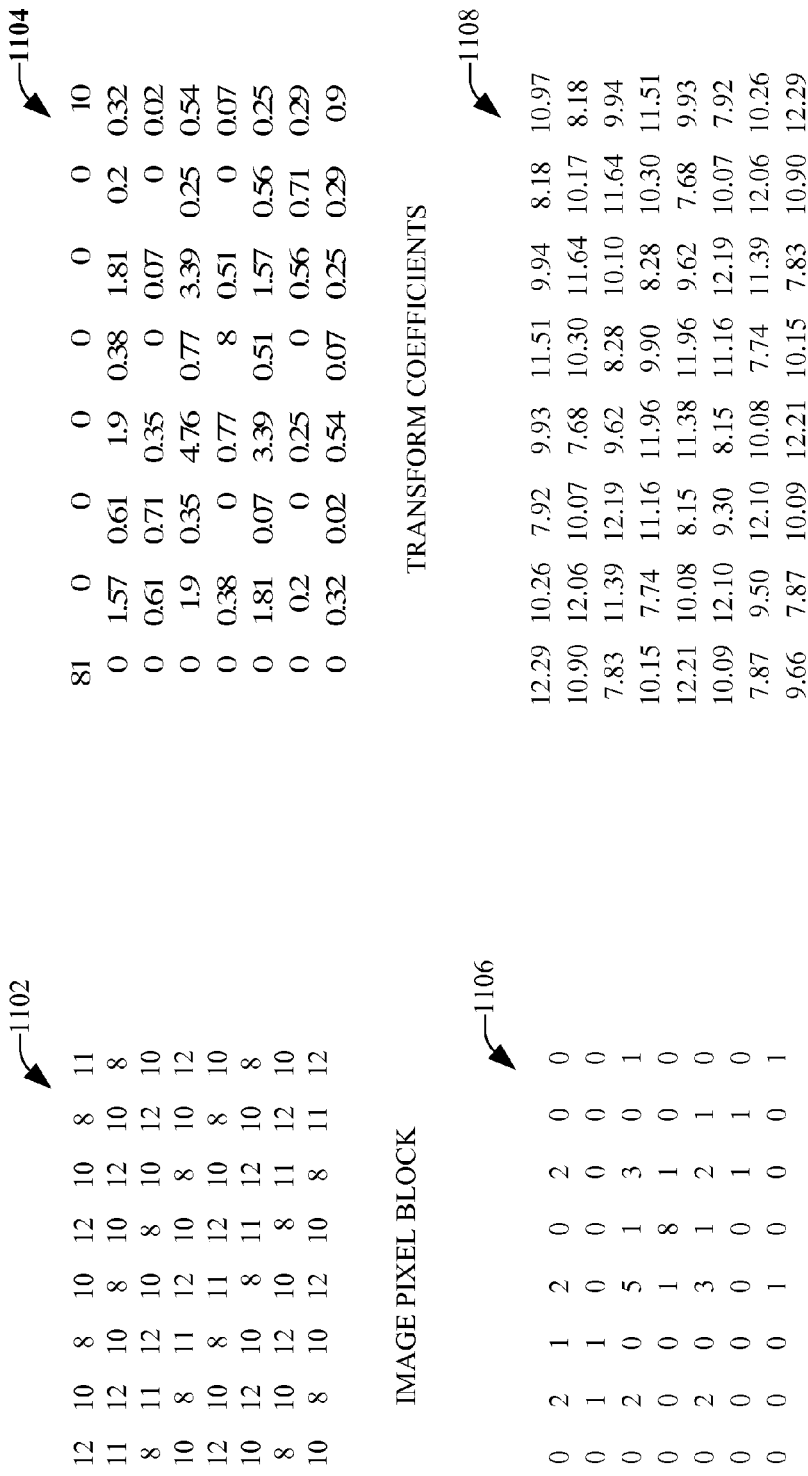
FIG. 11 illustrates an example graphical depiction of adaptive quantization.

FIG. 11 is to be read with references to FIGS. 2, 6, 7, 9 and 10. FIG. 11 illustrates a generalized diagram of an image that is coded and decoded. As discussed above, an input image frame 208 can be represented as a set of macroblocks 210. A macroblock 212 of the set of macroblocks 210 can be divided into smaller blocks 214, e.g., luma and chroma blocks. Block 1102 is an 8×8 matrix of an individual channel. It is to be understood and appreciated that other suitable block sizes can be utilized.

In this example, block 1102 can be input or transmitted to transform component 620. A DCT transform can be applied to block 1102 to generate the matrix 1104. Matrix 1104 is a set of transform coefficients which can be quantized in accordance with the disclosed subject matter. During quantization, for example at 908, noise can be suppressed in accordance with aspects of this disclosure to generate the matrix 1106. After quantization at 908, in one embodiment, the set of transform coefficients are reordered such that zeros are grouped together. At 1010 (in FIG. 10), noise can be synthesized via a transform domain representation of noise. Finally, an inverse transform can be applied (e.g., by decoder 720) to construct block 1108.

Figure 12:
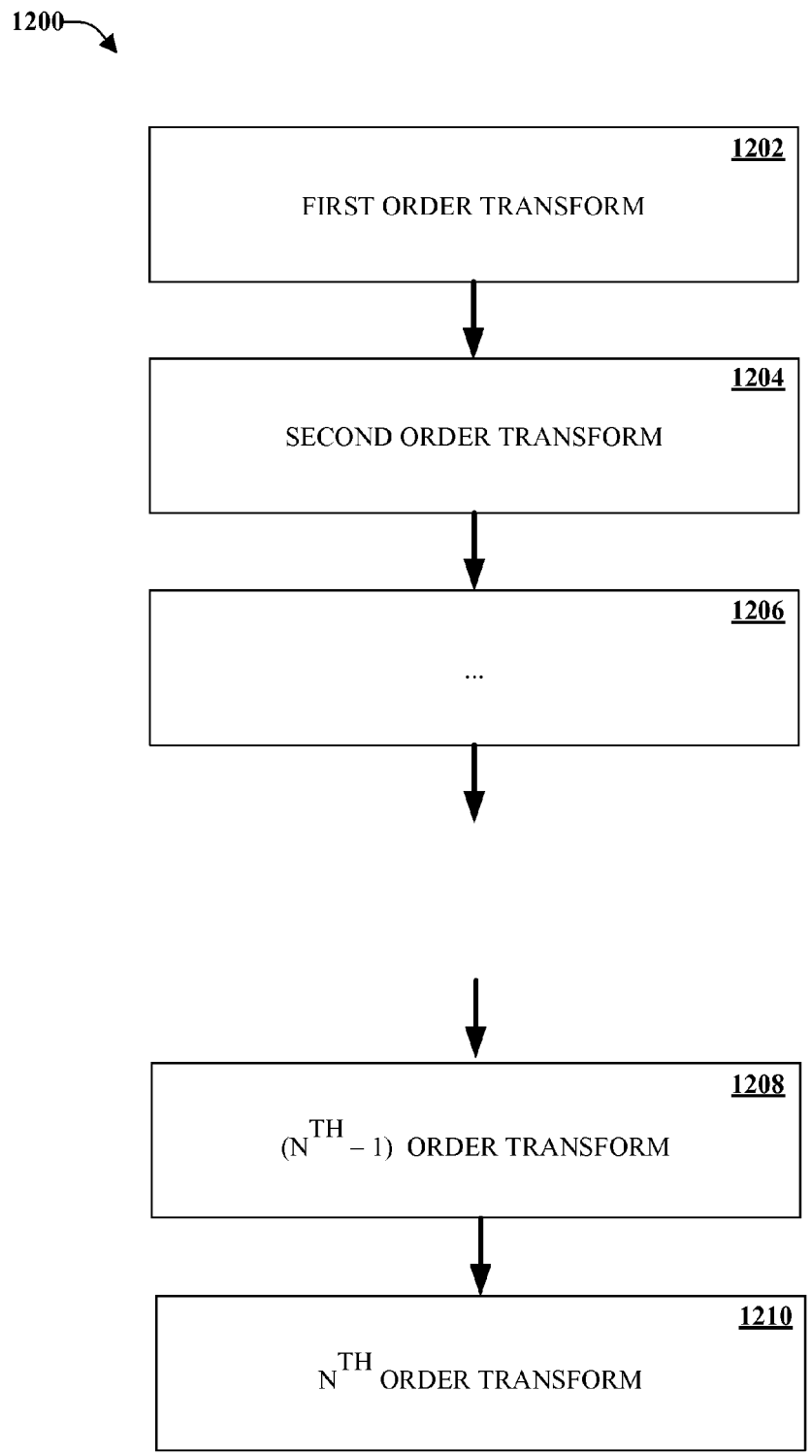
FIG. 12 illustrates an example methodology for transforming image pixel blocks.

Referring to FIG. 12, there illustrated is a methodology 1200 for representing noise as a set of transform coefficients during compression of media information, according to an aspect of the subject innovation. As an example, methodology 1200 can be utilized in various codec applications, such as, but not limited to, media capturing systems, media displaying systems, computing devices, cellular phones, tablets, etc. Specifically, methodology 1200 uses N transforms to produce a set of transform coefficients associated with a noise spectrum, wherein N is an integer.

Initially, media information can be divided into frames, and can be further divided into macroblocks (and divided further if desired). At 1202, a first order transform can be applied to a block. At 1204, a second order transform can be applied.

Other transforms continue to be applied at 1206 (e.g., a third order transform). Then, at 1208, an $N^{th}-1$ order transform can be applied, and finally, an $N^{th}$ order transform can be applied at 1210. It is to be understood and appreciated that any appropriate type of transform can be applied. For example, the first order transform can be a DCT transform and the second order transform can be a Walsh-Hadamard Transform (WHT). Typically, N inverse transforms are applied by the decoder when N transforms are applied by the encoder. For example, a DCT can be the first order transform and a WHT can be the second order transform. Thus, when decoding the encoded image frames, inverse WHT and inverse DCT can be applied.

Reference throughout this specification to "one embodiment," or "an embodiment," means that a particular feature, structure, or characteristic described in connection with the embodiment is included in at least one embodiment. Thus, the appearances of the phrase "in one embodiment," or "in an embodiment," in various places throughout this specification are not necessarily all referring to the same embodiment. Furthermore, the particular features, structures, or characteristics may be combined in any suitable manner in one or more embodiments.

As used in this application, the terms "component," "module," "system," or the like are generally intended to refer to a computer-related entity, either hardware (e.g., a circuit), a combination of hardware and software, software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. Further, a "device" can come in the form of specially designed hardware; generalized hardware made specialized by the execution of software thereon that enables the hardware to perform specific function (e.g., coding and/or decoding); software stored on a computer readable medium; or a combination thereof. For example, an encoder can refer to hardware, a combination of hardware and software, or software. Likewise, a decoder can refer to hardware, a combination of hardware and software, or software. It is to be understood that a codec as used herein can refer to at least one of an encoder or decoder.

Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

The systems and processes described below can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders, not all of which may be explicitly illustrated herein.

Figure 13:
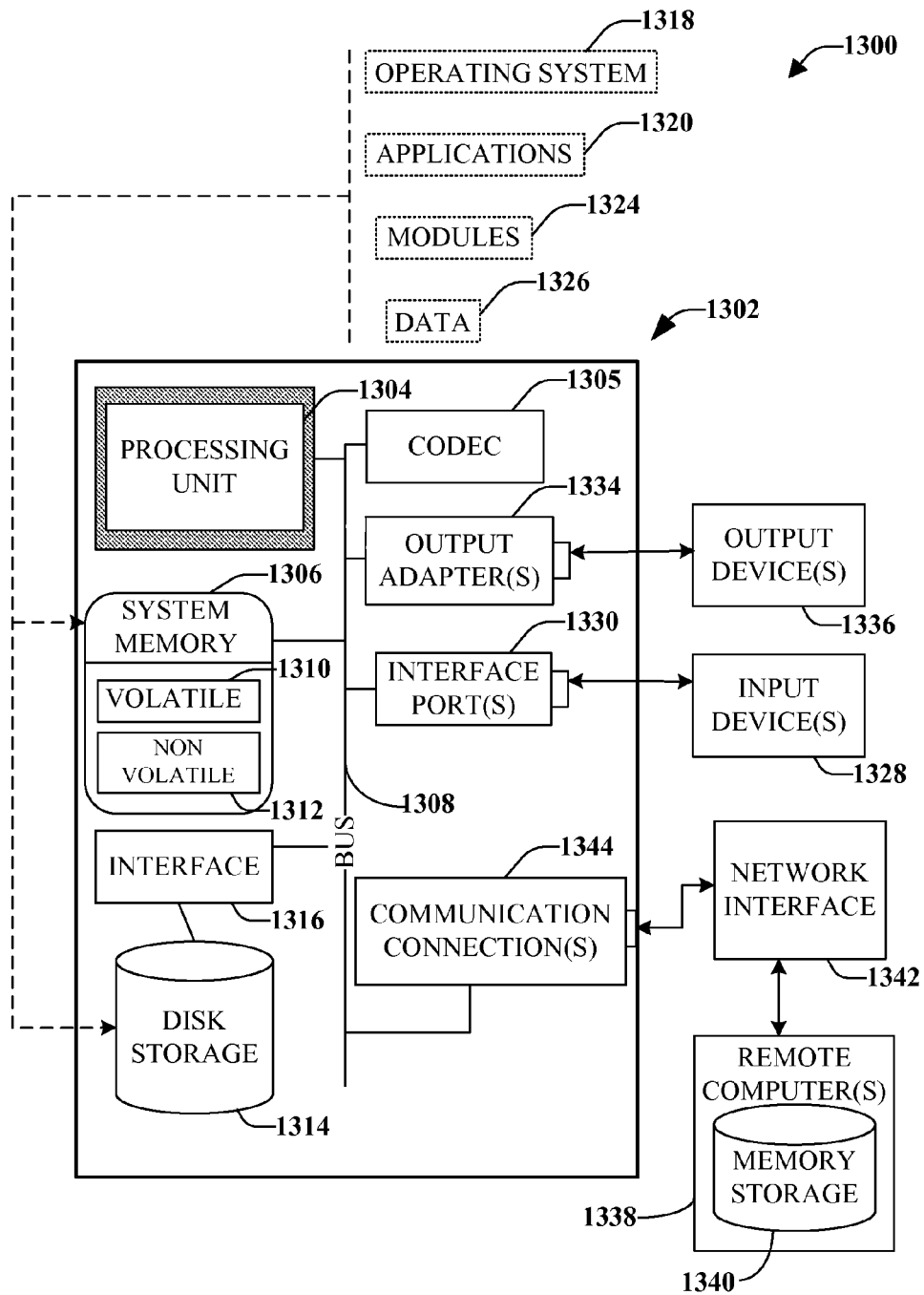
FIG. 13 illustrates an example schematic block diagram for a computing environment in accordance with the subject specification.

With reference to FIG. 13, a suitable environment 1300 for implementing various aspects of the claimed subject matter includes a computer 1302. The computer 1302 includes a processing unit 1304, a system memory 1306, a codec 1305, and a system bus 1308. The system bus 1308 couples system components including, but not limited to, the system memory 1306 to the processing unit 1304. The processing unit 1304 can be any of various available processors. Dual microprocessors and other multiprocessor architectures also can be employed as the processing unit 1304.

The system bus 1308 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCM-CIA), Firewire (IEEE 1394), and Small Computer Systems Interface (SCSI).

The system memory 1306 includes volatile memory 1310 and non-volatile memory 1312. The basic input/output system (BIOS), containing the basic routines to transfer information between elements within the computer 1302, such as during start-up, is stored in non-volatile memory 1312. In addition, according to present innovations, codec 1305 may include at least one of an encoder or decoder, wherein the at least one of an encoder or decoder may consist of hardware, a combination of hardware and software, or software. Although codec 1305 is depicted as a separate component, codec 1305 may be contained within non-volatile memory 1312. By way of illustration, and not limitation, non-volatile memory 1312 can include read only memory (ROM), programmable ROM (PROM), electrically programmable ROM (EPROM), electrically erasable programmable ROM (EEPROM), or flash memory. Volatile memory 1310 includes random access memory (RAM), which acts as external cache memory. According to present aspects, the volatile memory may store the write operation retry logic (not shown in FIG. 13) and the like. By way of illustration and not limitation, RAM is available in many forms such as static RAM (SRAM), dynamic RAM (DRAM), synchronous DRAM (SDRAM), double data rate SDRAM (DDR SDRAM), and enhanced SDRAM (ESDRAM).

Computer 1302 may also include removable/non-removable, volatile/non-volatile computer storage medium. FIG. 13 illustrates, for example, a disk storage 1314. Disk storage 1314 includes, but is not limited to, devices like a magnetic disk drive, solid state disk (SSD) floppy disk drive, tape drive, Jaz drive, Zip drive, LS-100 drive, flash memory card, or memory stick. In addition, disk storage 1314 can include storage medium separately or in combination with other storage medium including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1314 to the system bus 1308, a removable or non-removable interface is typically used, such as interface 1316.

It is to be appreciated that FIG. 13 describes software that acts as an intermediary between users and the basic computer resources described in the suitable operating environment 1300. Such software includes an operating system 1318. Operating system 1318, which can be stored on disk storage 1314, acts to control and allocate resources of the computer system 1302. Applications 1320 take advantage of the management of resources by operating system 1318 through program modules 1324, and program data 1326, such as the boot/shutdown transaction table and the like, stored either in system memory 1306 or on disk storage 1314. It is to be appreciated that the claimed subject matter can be implemented with various operating systems or combinations of operating systems.

A user enters commands or information into the computer 1302 through input device(s) 1328. Input devices 1328 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1304 through the system bus 1308 via interface port(s) 1330. Interface port(s) 1330 include, for example, a serial port, a parallel port, a game port, and a universal serial bus (USB). Output device(s) 1336 use some of the same type of ports as input device(s) 1328. Thus, for example, a USB port may be used to provide input to computer 1302, and to output information from computer 1302 to an output device 1336. Output adapter 1334 is provided to illustrate that there are some output devices 1336 like monitors, speakers, and printers, among other output devices 1336, which require special adapters. The output adapters 1334 include, by way of illustration and not limitation, video and sound cards that provide a means of connection between the output device 1336 and the system bus 1308. It should be noted that other devices and/or systems of devices provide both input and output capabilities such as remote computer(s) 1338.

Computer 1302 can operate in a networked environment using logical connections to one or more remote computers, such as remote computer(s) 1338. The remote computer(s) 1338 can be a personal computer, a server, a router, a network PC, a workstation, a microprocessor based appliance, a peer device, a smart phone, a tablet, or other network node, and typically includes many of the elements described relative to computer 1302. For purposes of brevity, only a memory storage device 1340 is illustrated with remote computer(s) 1338. Remote computer(s) 1338 is logically connected to computer 1302 through a network interface 1342 and then connected via communication connection(s) 1344. Network interface 1342 encompasses wire and/or wireless communication networks such as local-area networks (LAN) and wide-area networks (WAN) and cellular networks. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1344 refers to the hardware/software employed to connect the network interface 1342 to the bus 1308. While communication connection 1344 is shown for illustrative clarity inside computer 1302, it can also be external to computer 1302. The hardware/software necessary for connection to the network interface 1342 includes, for exemplary purposes only, internal and external technologies such as, modems including regular telephone grade modems, cable modems and DSL modems, ISDN adapters, and wired and wireless Ethernet cards, hubs, and routers.

Figure 14:
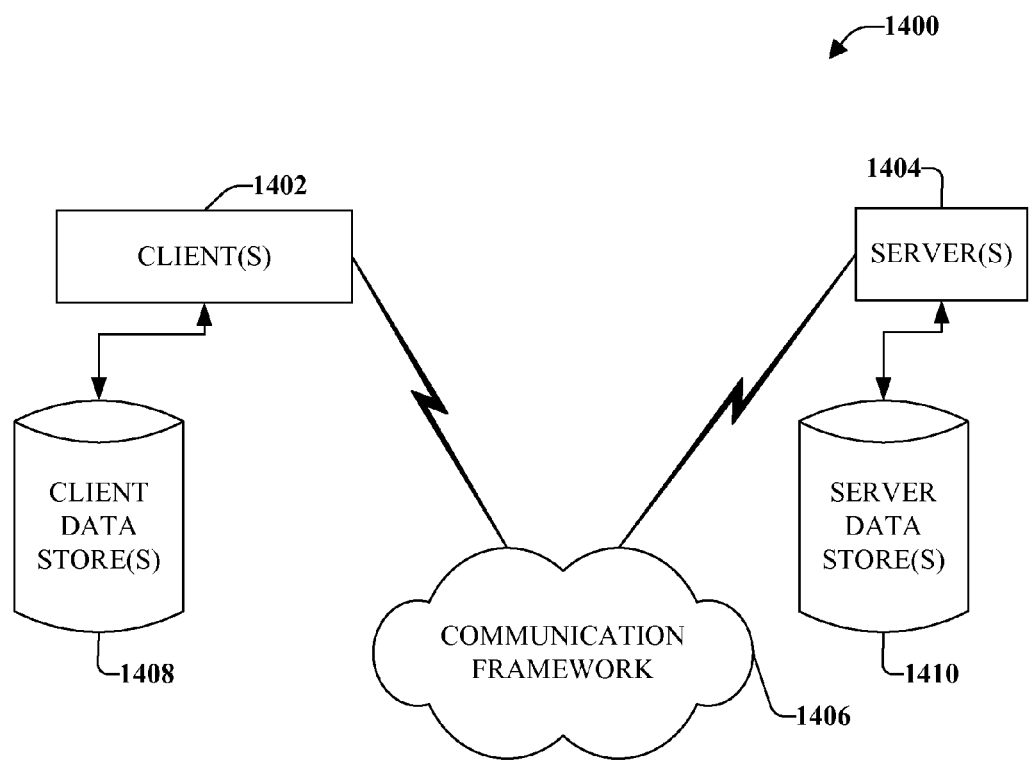
FIG. 14 illustrates an example block diagram of a computer operable to execute the disclosed architecture.

Referring now to FIG. 14, there is illustrated a schematic block diagram of a computing environment 1400 in accordance with this specification. The system 1400 includes one or more client(s) 1402 (e.g., laptops, smart phones, PDAs, media players, computers, portable electronic devices, tablets, and the like). The client(s) 1402 can be hardware and/or software (e.g., threads, processes, computing devices). The system 1400 also includes one or more server(s) 1404. The server(s) 1404 can also be hardware or hardware in combination with software (e.g., threads, processes, computing devices). The servers 1404 can house threads to perform transformations by employing aspects of this disclosure, for example. One possible communication between a client 1402 and a server 1404 can be in the form of a data packet transmitted between two or more computer processes wherein the data packet may include video data. The data packet can include a cookie and/or associated contextual information, for example. The system 1400 includes a communication framework 1406 (e.g., a global communication network such as the Internet, or mobile network(s)) that can be employed to facilitate communications between the client(s) 1402 and the server(s) 1404.

Communications can be facilitated via a wired (including optical fiber) and/or wireless technology. The client(s) 1402 are operatively connected to one or more client data store(s) 1408 that can be employed to store information local to the client(s) 1402 (e.g., cookie(s) and/or associated contextual information). Similarly, the server(s) 1404 are operatively connected to one or more server data store(s) 1410 that can be employed to store information local to the servers 1404.

In one embodiment, a client 1402 can transfer an encoded file, in accordance with the disclosed subject matter, to server 1404. Server 1404 can store the file, decode the file, or transmit the file to another client 1402. It is to be appreciated, that a client 1402 can also transfer an uncompressed file to a server 1404 and server 1404 can compress the file in accordance with the disclosed subject matter. Likewise, server 1404 can encode video information and transmit the information via communication framework 1406 to one or more clients 1402.

The illustrated aspects of the disclosure may also be practiced in distributed computing environments where certain tasks are performed by remote processing devices that are linked through a communications network. In a distributed computing environment, program modules can be located in both local and remote memory storage devices.

Moreover, it is to be appreciated that various components described herein can include electrical circuit(s) that can include components and circuitry elements of suitable value in order to implement the embodiments of the subject innovation(s). Furthermore, it can be appreciated that many of the various components can be implemented on one or more integrated circuit (IC) chips. For example, in one embodiment, a set of components can be implemented in a single IC chip. In other embodiments, one or more of respective components are fabricated or implemented on separate IC chips.

What has been described above includes examples of the embodiments of the present invention. It is, of course, not possible to describe every conceivable combination of components or methodologies for purposes of describing the claimed subject matter, but it is to be appreciated that many further combinations and permutations of the subject innovation are possible. Accordingly, the claimed subject matter is intended to embrace all such alterations, modifications, and variations that fall within the spirit and scope of the appended claims. Moreover, the above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In particular and in regard to the various functions performed by the above described components, devices, circuits, systems and the like, the terms used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable storage medium having computer-executable instructions for performing the acts and/or events of the various methods of the claimed subject matter.

The aforementioned systems/circuits/modules have been described with respect to interaction between several components/blocks. It can be appreciated that such systems/circuits and components/blocks can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but known by those of skill in the art.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than or equal to 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

What is claimed is:

1. A media codec system, comprising:
   a memory that stores computer executable components; and
   a processor that executes the following computer executable components stored within the memory:
   a noise representation component configured to identify a flat image region having pixel values with differences below a variance threshold, and to generate a noise energy spectrum by applying a transform to the flat image region to generate a first set of transform coefficients, the noise energy spectrum represented by the first set of transform coefficients;
   a quantization component configured to adaptively suppress noise associated with one or more blocks of an input image frame by changing a dead-zone of quantization based on the noise energy spectrum; and
   an entropy encoding component configured to receive quantized transform coefficients from the quantization component and to encode the quantized transform coefficients into a bitstream for transmission.

2. The system of claim 1, wherein the noise representation is configured to identify the flat image region within one or more input frames.

3. The system of claim 1, wherein the flat image region is identified based on comparison of variances in pixel values of a chroma or a luma image block.

4. The system of claim 1, wherein the noise representation component is configured to generate a first noise energy spectrum for a first flat image region and a second noise energy spectrum for a second flat image region, the first flat image region having pixel luma values with differences below a first variance threshold and the second flat image region having pixel chroma values with differences below a second variance threshold; and wherein the quantization component is configured to adaptively suppress noise associated with the one or more blocks by changing the dead-zone of quantization for luma blocks based on the first noise energy spectrum and changing the dead-zone of quantization for chroma blocks based on the second noise energy spectrum.

5. The system of claim 1, wherein the noise energy spectrum is associated with several flat image regions.

6. The system of claim 1, wherein the noise representation component utilizes calibration information to generate the noise energy spectrum.

7. The system of claim 6, wherein the calibration information is based on equipment noise.

8. The system of claim 6, wherein the calibration information is based on a flat background image.

9. The system of claim 1, wherein the quantization component adaptively changes the dead-zone of quantization of a second set of transform coefficients.

10. The system of claim 9, wherein the quantization component uses the first set of transform coefficients to define threshold values associated with the dead-zone of the second set of transform coefficients.

11. The system of claim 10, wherein the threshold values are a function of the values of the first set of transform coefficients.

12. The system of claim 11, wherein the threshold values are equal to the values of the first set of transform coefficients.

13. The system of claim 1, wherein the noise representation component generates a first noise energy spectrum based on variances in luma components and a second noise energy spectrum based on variances in chroma components.

14. A media codec system, comprising:
    a memory that stores computer executable components; and
    a microprocessor that executes the following computer executable components stored within the memory:
    an entropy decoding component configured to receive a bit stream and generate header information and sets of quantized coefficients from the bit stream;
    a de-quantization component configured to de-quantize the sets of quantized coefficients and synthesize noise into the sets of quantized coefficients to generate sets of de-quantized coefficients including the noise; and
    an inverse transformation component configured to receive the sets of de-quantized coefficients including the noise and inverse transform the sets of de-quantized coefficients to generate decompressed media data.

15. The system of claim 14, wherein the header information comprises noise energy information, the noise energy information represented by a first set of transform coefficients generated by applying a transform to a flat image region, the flat image region having pixel values with differences below a variance threshold.

16. The system of claim 15, wherein the de-quantization component employs the noise energy information to synthesize noise into the sets of quantized coefficients by using each transform coefficient of the flat image region to define a respective threshold for a dead-zone of quantization to be applied to a spatially-corresponding quantized coefficient of the sets of quantized coefficients.

17. A media compression method, comprising:
    employing a microprocessor to execute computer executable instructions stored in a memory to perform the following acts:
    generating a noise energy spectrum by applying a transform to the flat image region to generate a first set of transform coefficients, the flat image region having pixel values with differences below a variance threshold and the noise energy spectrum represented by the first set of transform coefficients;
    adaptively changing a set of dead-zone values of quantization for each quantized coefficient of a block of video image data according to a spatially-corresponding transform coefficient of the first set of transform coefficients;
    using the set of dead-zone values of quantization to generate a second set of transform coefficients associated with compressed image data so as to reduce noise within the block; and
    entropy encoding the quantized second set of transform coefficients for inclusion in a bitstream.

18. The method of claim 17, wherein the dead-zone values are set to be equal to the values of the first set of transform coefficients.

19. The method of claim 17, wherein the noise energy spectrum is generated by using one or more of calibration information, equipment noise or a flat background image.

20. The method of claim 17, further comprising generating a plurality of noise energy spectrums and corresponding sets of dead-zone values of quantization.

21. A media decompression method, comprising:

employing a microprocessor to execute computer executable instruction stored in a memory to perform the following act:

using a set of dead-zone values of quantization to decompress compressed image data, wherein the dead-zone values correspond to a noise energy spectrum.

22. The method of claim 21, wherein the dead-zone values are read from the compressed image data and are generated by a combination of a quantization value of the compressed image data and a first set of transform coefficients generated by applying a transform to a flat image region, the flat image region having pixel values with differences below a variance threshold.

23. An apparatus comprising a computer readable medium encoding the following computer executable components:

a noise representation component configured to receive calibration information and video image data and to use the calibration information to generate a noise energy spectrum;

a quantization component configured to use the noise energy spectrum to generate a plurality of thresholds to selectively discard a portion of the video image data associated with noise for quantization, each of the plurality of thresholds based on a respective value within the noise energy spectrum; and an entropy encoding component configured to receive quantized transform coefficients from the quantization component and to encode the quantized transform coefficients into a bitstream for transmission.

24. The apparatus of claim 23, wherein the noise representation component identifies a flat region associated with the video image data, the flat region having pixel values with difference below a variance threshold.

25. The apparatus of claim 23, wherein the noise energy spectrum is generated by applying a transform to a flat region to generate a set of transform coefficients as values of the noise energy spectrum, the flat region having pixel values with differences below a variance threshold.

26. The apparatus of claim 25, wherein each of the plurality of thresholds is applied to a spatially-corresponding quantized coefficient of sets of quantized coefficients forming blocks of a video frame of the video image data.

* * * * *